(12) United States Patent
Lynn et al.

(10) Patent No.: US 7,320,104 B2
(45) Date of Patent: Jan. 15, 2008

(54) TEXT GRID CREATION TOOLS

(75) Inventors: Heath A. Lynn, Lynwood, WA (US); Marilyn E. Shade, Menlo Park, CA (US); Nathaniel McCully, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 583 days.

(21) Appl. No.: 10/203,668

(22) PCT Filed: Feb. 12, 2001

(86) PCT No.: PCT/US01/04661

§ 371 (c)(1),
(2), (4) Date: Oct. 31, 2002

(87) PCT Pub. No.: WO01/59576

PCT Pub. Date: Aug. 16, 2001

(65) Prior Publication Data

US 2003/0229856 A1 Dec. 11, 2003

(51) Int. Cl.
*G06F 17/00* (2006.01)
(52) U.S. Cl. .............. 715/517; 715/513; 715/530; 715/531
(58) Field of Classification Search ........... 715/517, 715/514, 513, 511, 520, 507, 515, 530, 531
See application file for complete search history.

(56) References Cited

U.S. PATENT DOCUMENTS 4,251,799 A   2/1981   Jih
4,284,975 A   8/1981   Odaka ................ 382/185

(Continued)

FOREIGN PATENT DOCUMENTS

JP      61-282974      12/1986

(Continued)

OTHER PUBLICATIONS

Courter et al.,"Mastering Microsoft Office 2000 Professional Addition", Apr. 1999, Sybex, pp. 24, 959, 962, 964.*

(Continued)

*Primary Examiner*—Doug Hutton
*Assistant Examiner*—James H. Blackwell
(74) *Attorney, Agent, or Firm*—Fish & Richardson P.C.

(57) ABSTRACT

Methods and apparatus, including computer program products, implementing and using techniques for controlling typesetting and layout editing (2a). Data being typeset or laid out are displayed on a display (3). A first menu (20) having a user-selectable first creation mode and second creation mode are displayed on the display (3) to create a new electronic document in accordance with a user-input control instruction. A second menu (21) having previously set values for grid parameters demarcating an appropriate layout grid (123) for the new electronic document is displayed if the user selects the first creation mode. A layout grid (123) is created on each page of the electronic document by receiving a user approval of the values set in the second menu (21). This eliminates the necessity of separately having to calculate page margins. Furthermore, when creating a frame grid (30) on a layout grid (123), or when changing its dimensions, the frame and grid are always automatically coordinated.

28 Claims, 16 Drawing Sheets

U.S. PATENT DOCUMENTS

| | | | |
|---|---|---|---|
| 4,291,381 A | 9/1981 | Siebeck | 715/519 |
| 4,539,653 A * | 9/1985 | Bartlett et al. | 715/520 |
| 4,591,999 A | 5/1986 | Logan | 715/519 |
| 4,608,664 A | 8/1986 | Bartlett et al. | 358/1.2 |
| 4,755,955 A * | 7/1988 | Kimura et al. | 715/521 |
| 4,833,627 A | 5/1989 | Leszczynski | 715/519 |
| 4,860,456 A | 8/1989 | Arnao | |
| 4,891,770 A * | 1/1990 | Hollett | 345/441 |
| 4,928,252 A * | 5/1990 | Gabbe et al. | 358/1.2 |
| 4,974,174 A | 11/1990 | Kleinman | |
| 5,003,499 A * | 3/1991 | Fujiwara et al. | 715/520 |
| 5,018,083 A | 5/1991 | Wantanabe et al. | 715/517 |
| 5,068,809 A * | 11/1991 | Verhelst et al. | 705/518 |
| 5,140,676 A * | 8/1992 | Langelaan | 715/515 |
| 5,175,806 A | 12/1992 | Muskovitz et al. | 345/582 |
| 5,287,443 A | 2/1994 | Mameda et al. | 715/522 |
| 5,339,392 A * | 8/1994 | Risberg et al. | 715/762 |
| 5,399,029 A | 3/1995 | Muraoka et al. | 400/9 |
| 5,416,898 A | 5/1995 | Opstad et al. | 345/468 |
| 5,432,890 A | 7/1995 | Watanabe | 715/519 |
| 5,434,961 A * | 7/1995 | Horiuchi et al. | 715/507 |
| 5,459,826 A * | 10/1995 | Archibald | 715/517 |
| 5,490,241 A * | 2/1996 | Mallgren et al. | 345/440 |
| 5,500,931 A | 3/1996 | Sonnenschein | 715/529 |
| 5,501,538 A | 3/1996 | Sawada et al. | 400/304 |
| 5,548,700 A | 8/1996 | Bagley et al. | 715/540 |
| 5,579,471 A | 11/1996 | Barber et al. | 715/700 |
| 5,581,670 A | 12/1996 | Bier et al. | 715/856 |
| 5,588,108 A * | 12/1996 | Kumar et al. | 715/765 |
| 5,617,115 A | 4/1997 | Itoh et al. | 345/467 |
| 5,634,064 A * | 5/1997 | Warnock et al. | 715/513 |
| 5,636,132 A * | 6/1997 | Kamdar | 716/2 |
| 5,710,896 A * | 1/1998 | Seidl | 715/744 |
| 5,724,072 A | 3/1998 | Freeman et al. | 345/648 |
| 5,724,596 A | 3/1998 | Lathrop | 715/519 |
| 5,729,751 A * | 3/1998 | Schoolcraft | 715/530 |
| 5,734,915 A * | 3/1998 | Roewer | 715/512 |
| 5,740,456 A | 4/1998 | Harel et al. | 715/518 |
| 5,778,403 A | 7/1998 | Bangs | 715/527 |
| 5,802,532 A | 9/1998 | Nakayama et al. | 715/519 |
| 5,803,629 A * | 9/1998 | Neville et al. | 400/304 |
| 5,805,167 A | 9/1998 | van Cruyningen | 715/808 |
| 5,809,166 A | 9/1998 | Huang et al. | 382/178 |
| 5,845,299 A * | 12/1998 | Arora et al. | 715/513 |
| 5,893,145 A * | 4/1999 | Thayer et al. | 711/125 |
| 5,911,145 A * | 6/1999 | Arora et al. | 715/514 |
| 5,923,329 A * | 7/1999 | Beale | 345/418 |
| 5,937,420 A | 8/1999 | Karow et al. | 715/518 |
| 5,963,641 A * | 10/1999 | Crandall et al. | 380/2 |
| RE36,704 E * | 5/2000 | Parker et al. | 715/542 |
| 6,088,520 A | 7/2000 | Taoka et al. | 716/21 |
| 6,134,568 A * | 10/2000 | Tonkin | 715/526 |
| 6,161,116 A * | 12/2000 | Saltzman | 715/535 |
| 6,252,607 B1 * | 6/2001 | Babcock | 345/468 |
| 6,321,243 B1 | 11/2001 | Ballard | 715/517 |
| 6,330,577 B1 | 12/2001 | Kim | 715/542 |
| 6,359,630 B1 | 3/2002 | Morse et al. | 345/620 |
| 6,426,751 B1 | 7/2002 | Patel et al. | 345/468 |
| 6,434,579 B1 * | 8/2002 | Shaffer et al. | 715/520 |
| 6,448,964 B1 * | 9/2002 | Isaacs et al. | 345/419 |
| 6,504,544 B1 | 1/2003 | Hollingsworth et al. | 345/467 |
| 6,510,441 B1 | 1/2003 | Kenninga | 715/521 |
| 6,613,099 B2 * | 9/2003 | Crim | 715/523 |
| 6,624,814 B1 | 9/2003 | Karow et al. | 345/467 |
| 6,741,268 B1 * | 5/2004 | Hayakawa | 715/777 |
| 6,886,133 B2 * | 4/2005 | Bailey et al. | 715/531 |
| 6,928,611 B2 * | 8/2005 | McCully et al. | 715/519 |
| 2001/0048764 A1 | 12/2001 | Betrisey et al. | 382/162 |
| 2002/0035697 A1 * | 3/2002 | McCurdy et al. | 713/200 |
| 2002/0062324 A1 | 5/2002 | McCully et al. | 715/517 |
| 2003/0229856 A1 * | 12/2003 | Lynn et al. | 715/517 |
| 2004/0268255 A1 | 12/2004 | McCully | |

FOREIGN PATENT DOCUMENTS

| | | |
|---|---|---|
| JP | 01-125656 | 5/1989 |
| JP | 1-271275 | 10/1989 |
| JP | 02-213983 | 8/1990 |
| JP | 04-052871 | 2/1992 |
| JP | 05-224651 | 9/1993 |
| JP | 06-20026 | 1/1994 |
| JP | 06-96174 | 4/1994 |
| JP | 06-149806 | 5/1994 |
| JP | 07-096594 | 4/1995 |
| JP | 07-149005 | 6/1995 |
| JP | 07-182303 | 7/1995 |
| JP | 8-137871 | 5/1996 |
| JP | 8-161309 | 6/1996 |
| JP | 08-194832 | 7/1996 |
| JP | 08-314655 | 11/1996 |
| JP | 10-069477 | 3/1998 |
| JP | 10-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

OTHER PUBLICATIONS

R. Newton, "Inside Generic CADD", 1991, New Riders Publishing, pp. 17, 76, 78.*

Courter, "Mastering Microsoft Office 2000, Professional Edition", Sybex, Apr. 1999, Pages.*

Gross, "Grids in Design and CAD", 1991, Proc. of Assn. for CAD in Architecture, LA, 11 pages.*

Microsoft, "Structure Your Publication Design Using Layout Guides", date unknown, Microsoft, 8 pages.*

Pagestream, "Guides and the Grid", date unknown, <http://www.grasshopperllc.com/help/PGSuser/guidegrid.html>, downloaded Jan. 3, 2006.*

Adobe, "Lesson 8.2: Layout Grids", Adobe Web Tech Curriculum, data unknown, <http://www.adobe.com/education/webtech/unit_site_dev2/lg_print.htm> downloaded Jan. 3, 2006 10 pages.*

Finkelstein, "Precision Layout Creates Clear and Professional Design", date unknwon, <http://printthis.clickability.com/> downloaded Jan. 3, 2006.*

Arah, "Layout Grids—On The Grid, The Importance of Good Grid Handling", Nov. 1997, <http://www.designer-info.com/DTP/dtp_grids.htm> downloaded Jan. 3, 2006.*

Microsoft, "Microsoft Word Manual", Copyright 1993-1994 Microsoft Pages.*

Microsoft, Screen Shots from Microsoft Word 2000, copyright circa 1999, Figs. 1-16.*

Microsoft, Screen Shots from Microsoft Word 2000, copyright circa 1999, Figs. 17-24.*

U.S. Appl. No. 09/964,293, filed Sep. 25, 2001, Shade et al.

Hirschberg, D.S. et al., "New Applications of Failure Functions", *Journal of the Association for Computing Machinery*, vol. 34, No. 3, Jul. 1987, pp. 616-625.

Peter Karow, "Extending Control of Digital Typography", Visible Language, 32.2, Visible Language 1998, pp. 100-127 (671001 IDS Sep. 30, 2004).

* cited by examiner

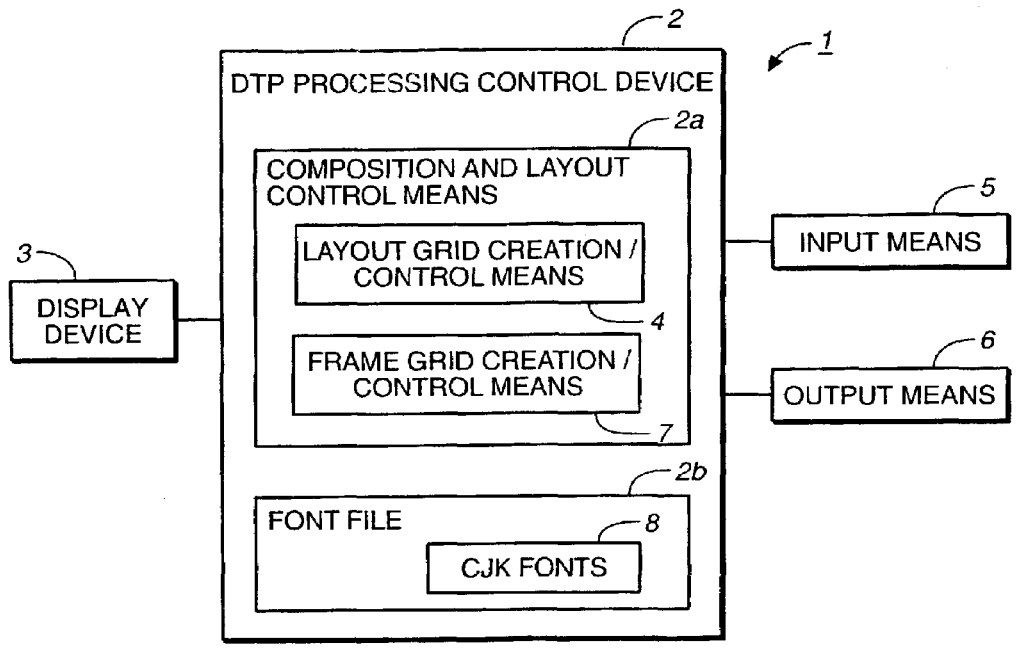
FIG._1
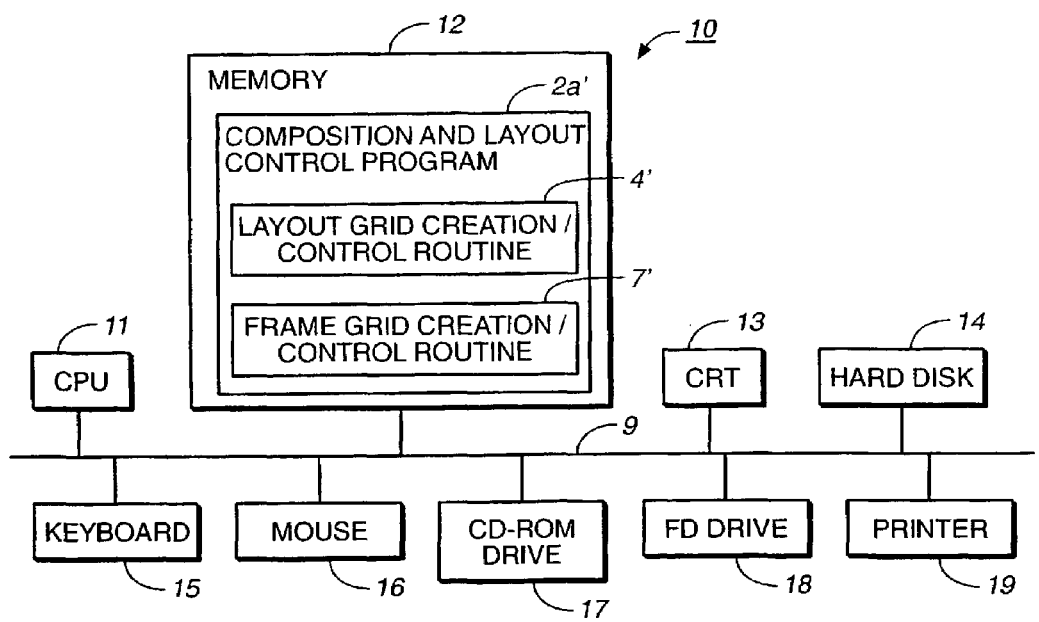
FIG._2

*20*

| NEW DOCUMENT |||||
|---|---|---|---|---|
| NUMBER OF PAGE: | 1 | | | |
| PAGE DIMENSIONS: | LETTER | WIDTH: 51 p0 | HEIGHT: | 66 p0 |
| DOCUMENT CREATION: | LAYOUT GRID | | MARGIN/COLUMN | |

| LAYOUT GRID |||||
|---|---|---|---|---|
| SET GRID | | | | |
| | ORIENTATION: | HORIZONTAL | | |
| | FONT: | MING-DYNASTY STYLE | CHARACTER SCALE: | 100% |
| | DIMENSIONS: | 12 pt | LINE SCALE: | 100% |
| | INTERCHARACTER SPACING: | 0 pt | INTERLINE SPACING: | 6 pt |
| LINE AND COLUMN | | | | |
| | NUMBER OF CHARACTERS | 45 | NUMBER OF LINES: | 40 |
| | NUMBER OF COLUMNS | 1 | GUTTER: | 1 p0 |
| GRID STARTING POINT: | TOP/OUTSIDE | | | |
| | TOP: | 3 p0 | BOTTOM: | 3 p6 |
| | OUTSIDE: | 3 p0 | INSIDE: | 3 p0 |

*FIG._4*

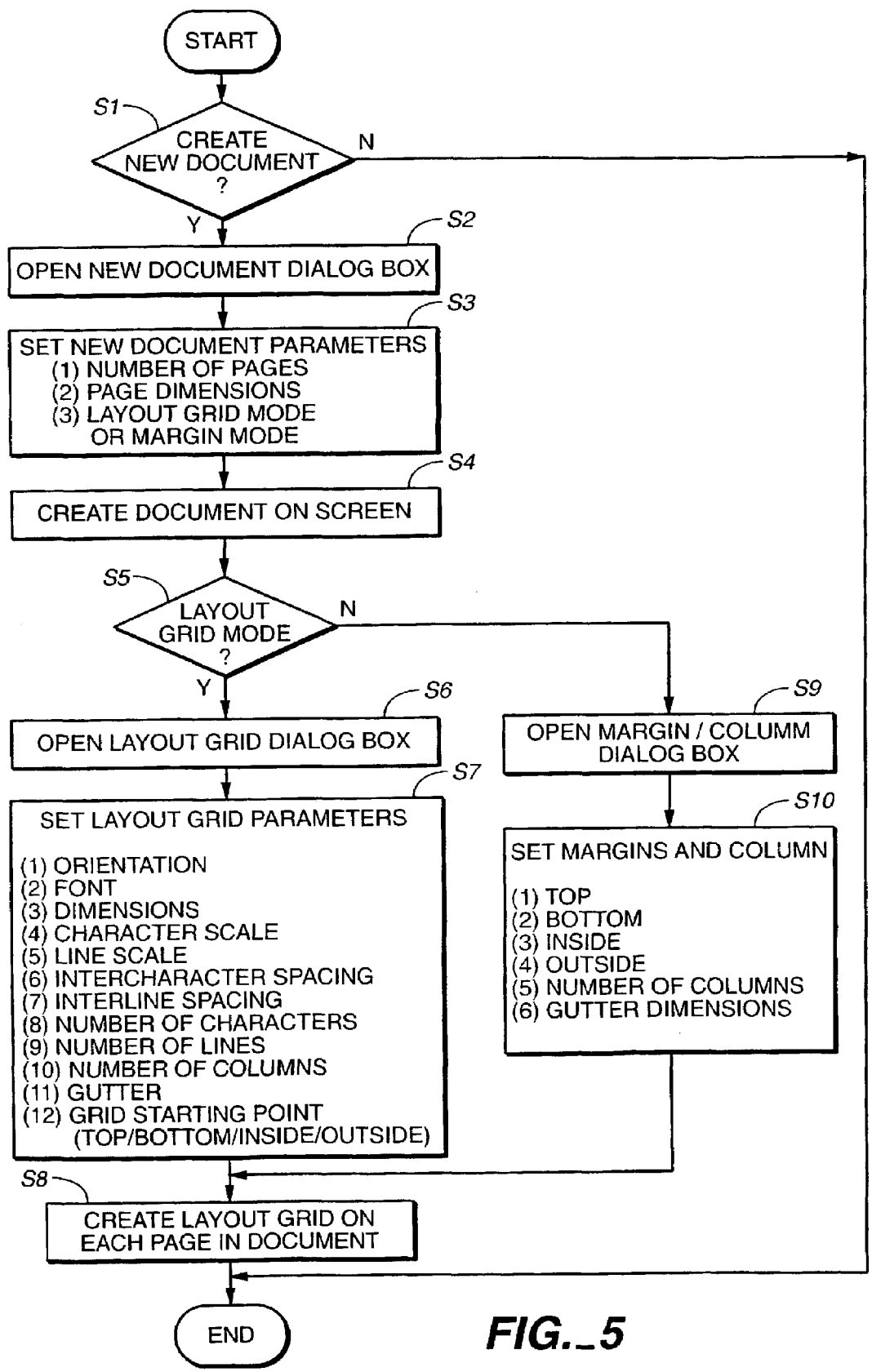
FIG._5

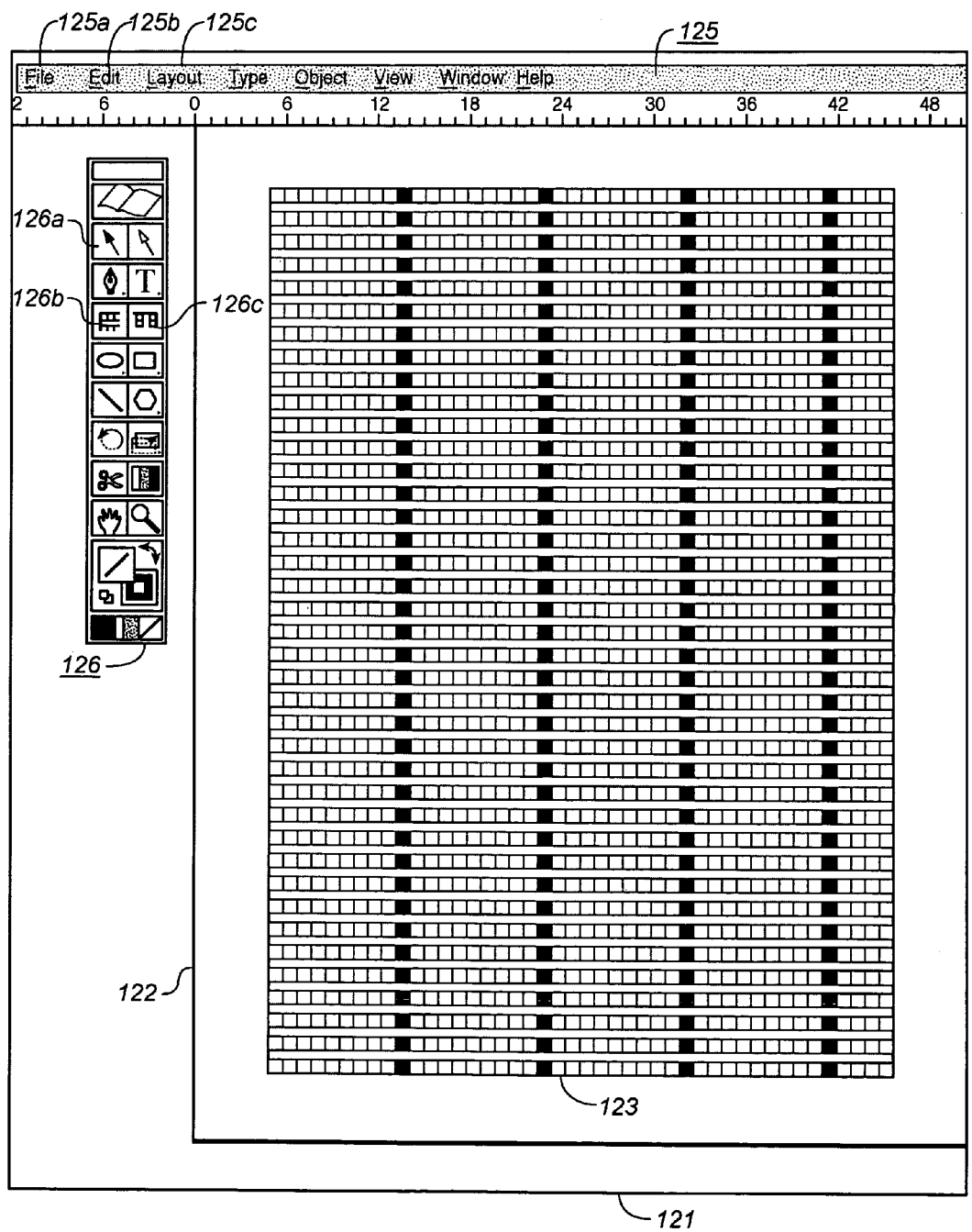
FIG._6

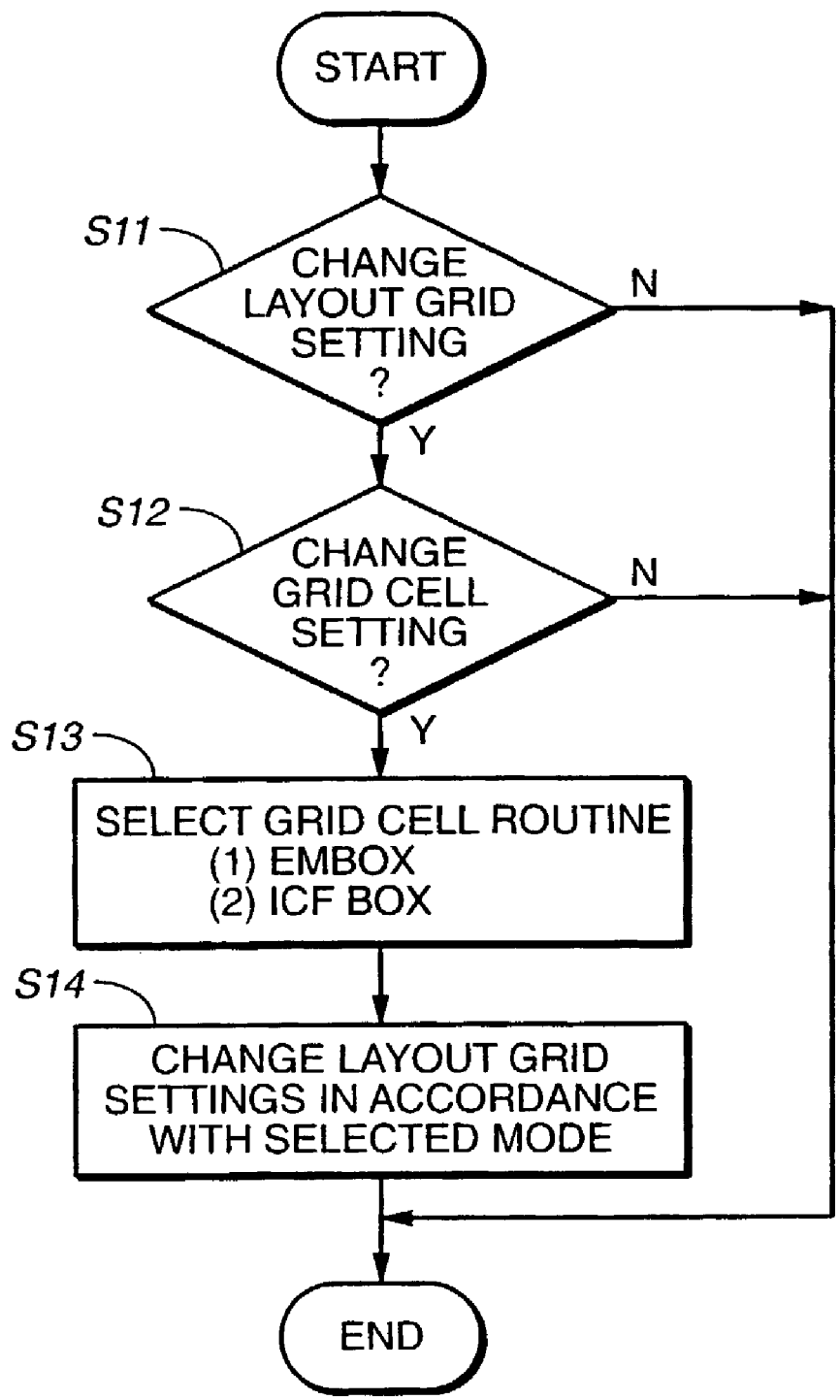
FIG._7

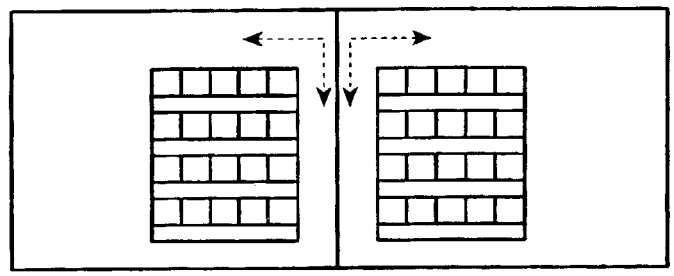
FIG._8A
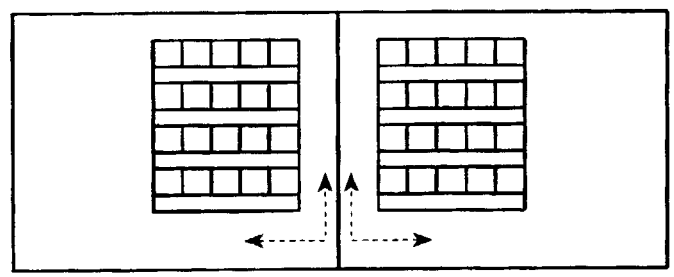
FIG._8B
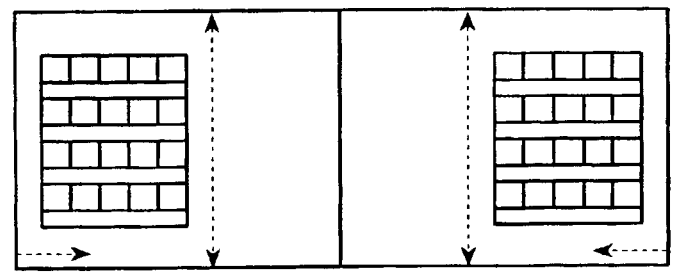
FIG._8C
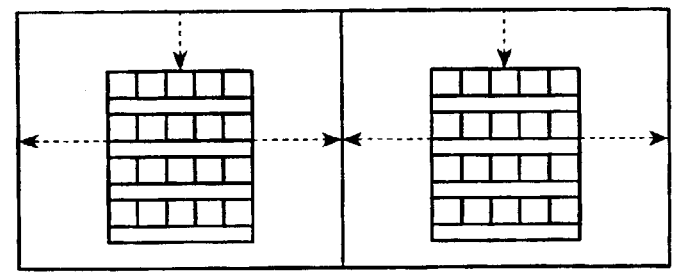
FIG._8D

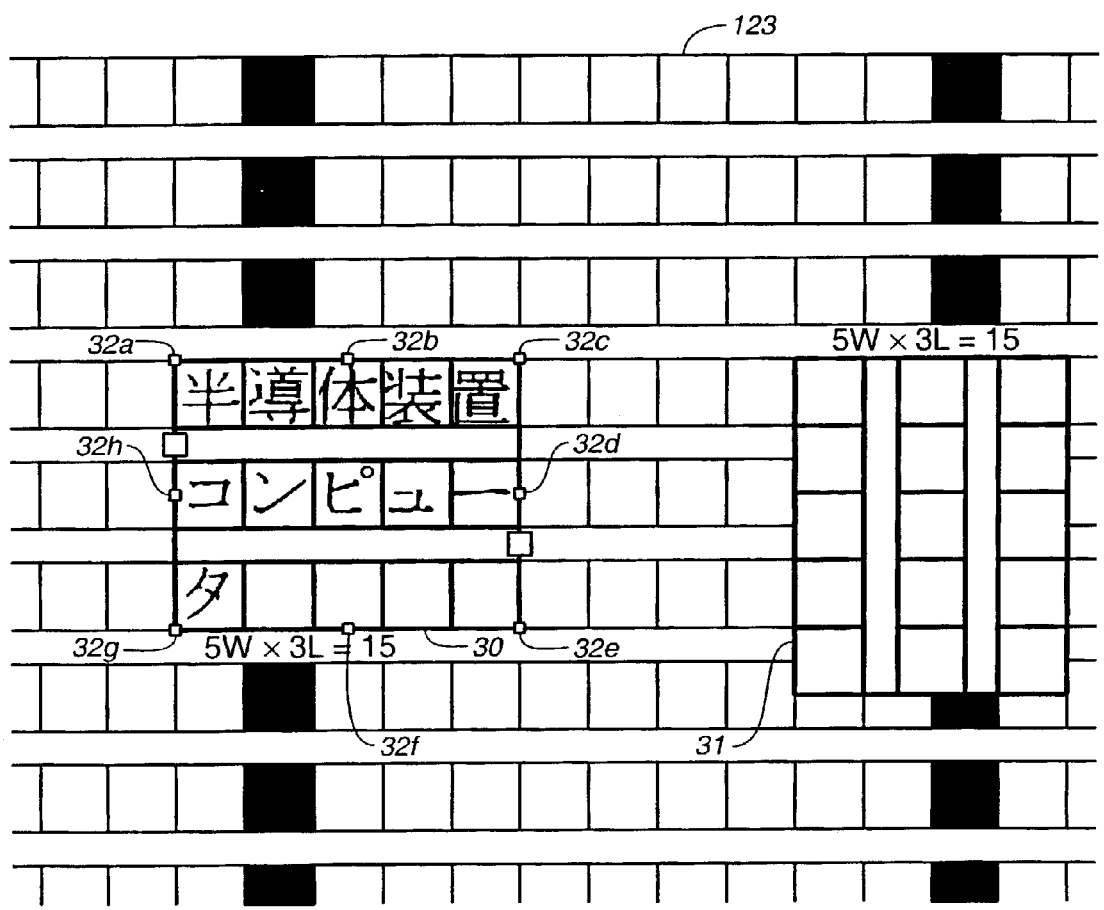
FIG._9

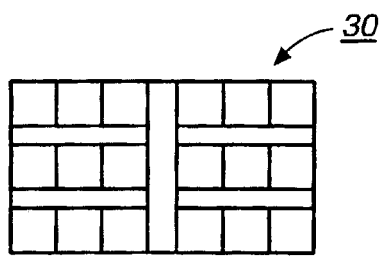
FIG._10A
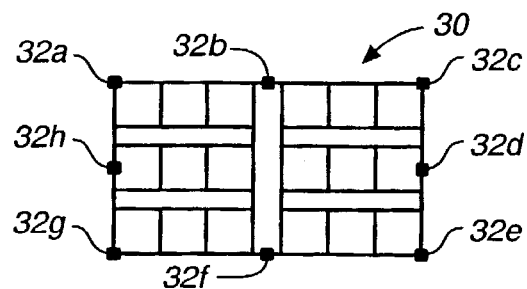
FIG._10B
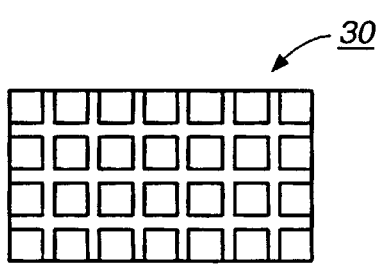
FIG._10C
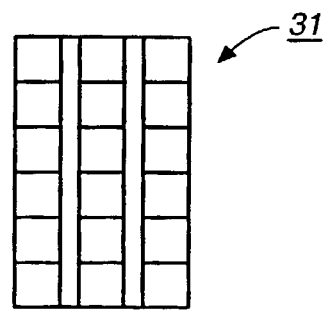
FIG._10D
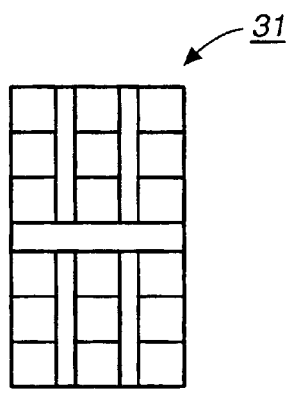
FIG._10E
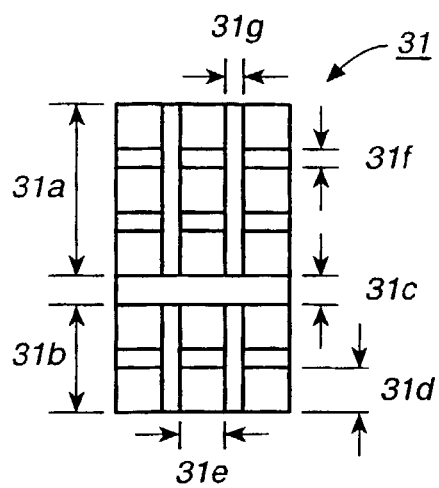
FIG._10F

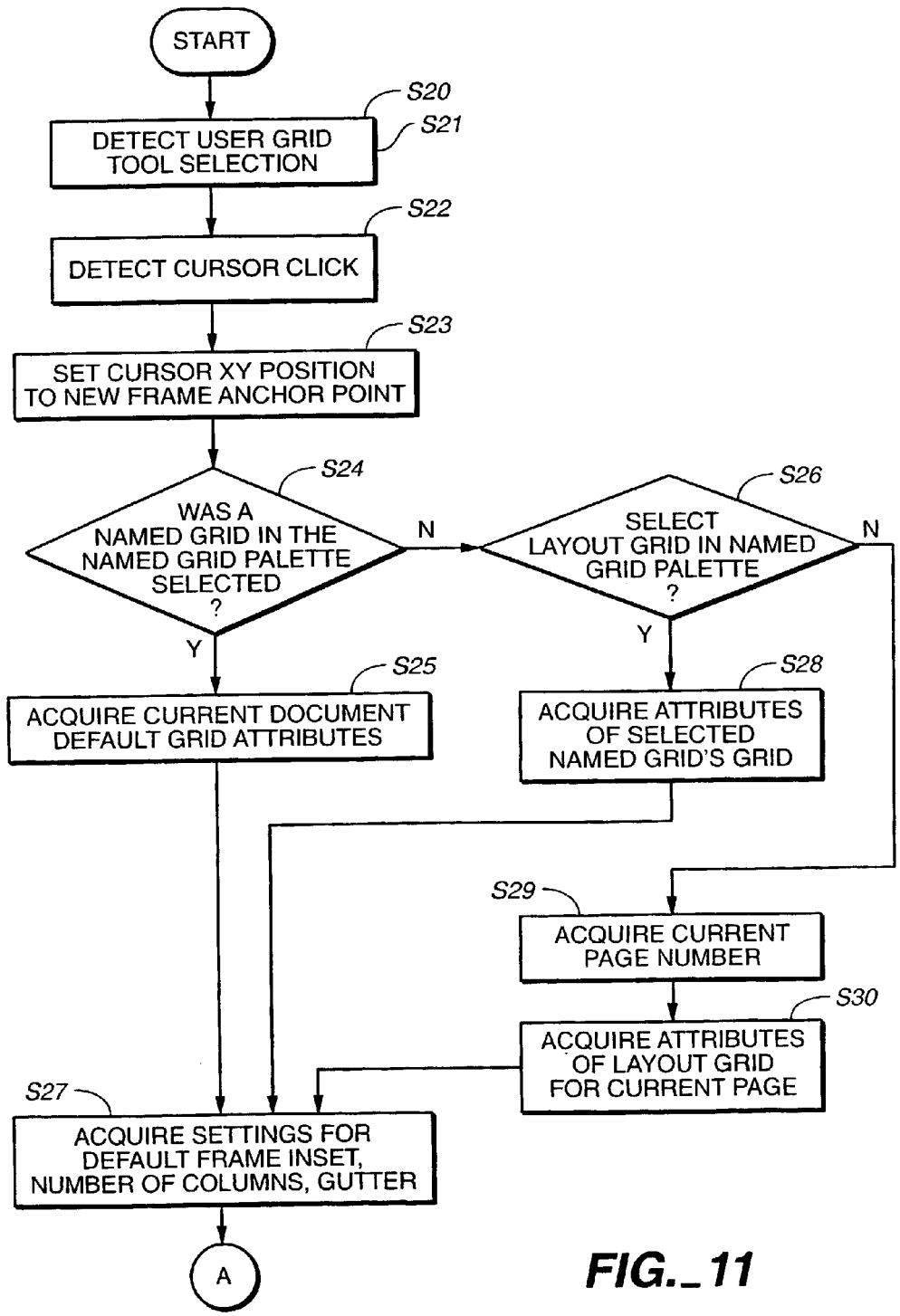
FIG._11

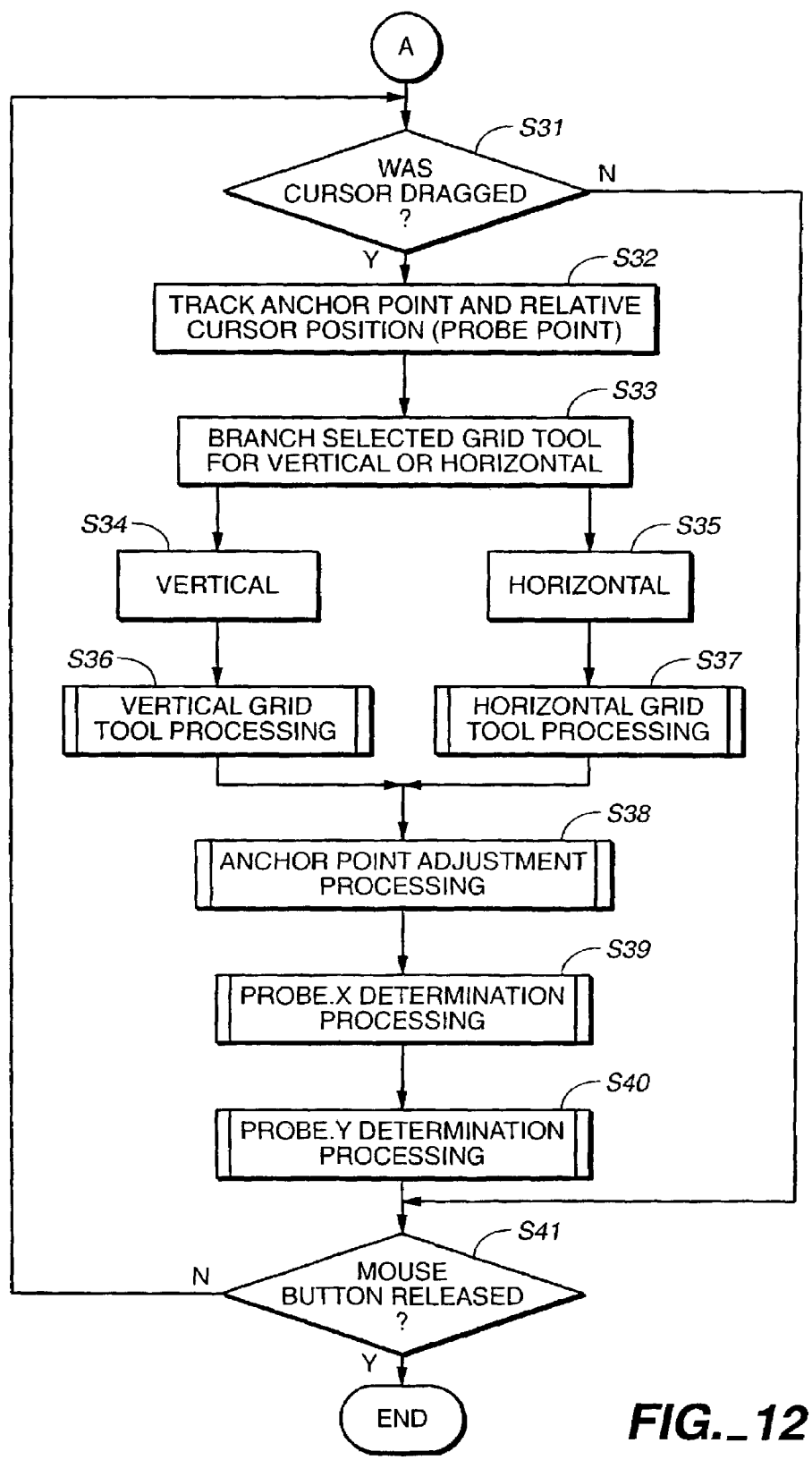
FIG._12

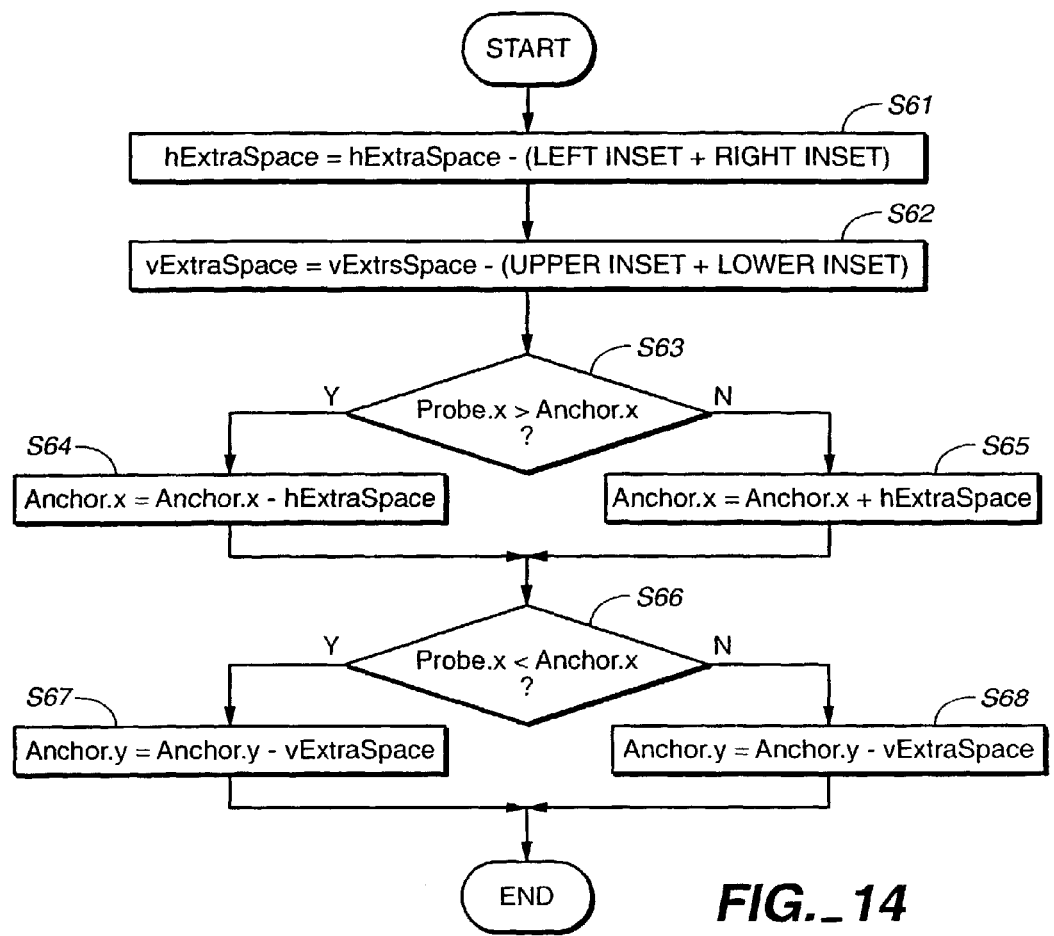
FIG._14

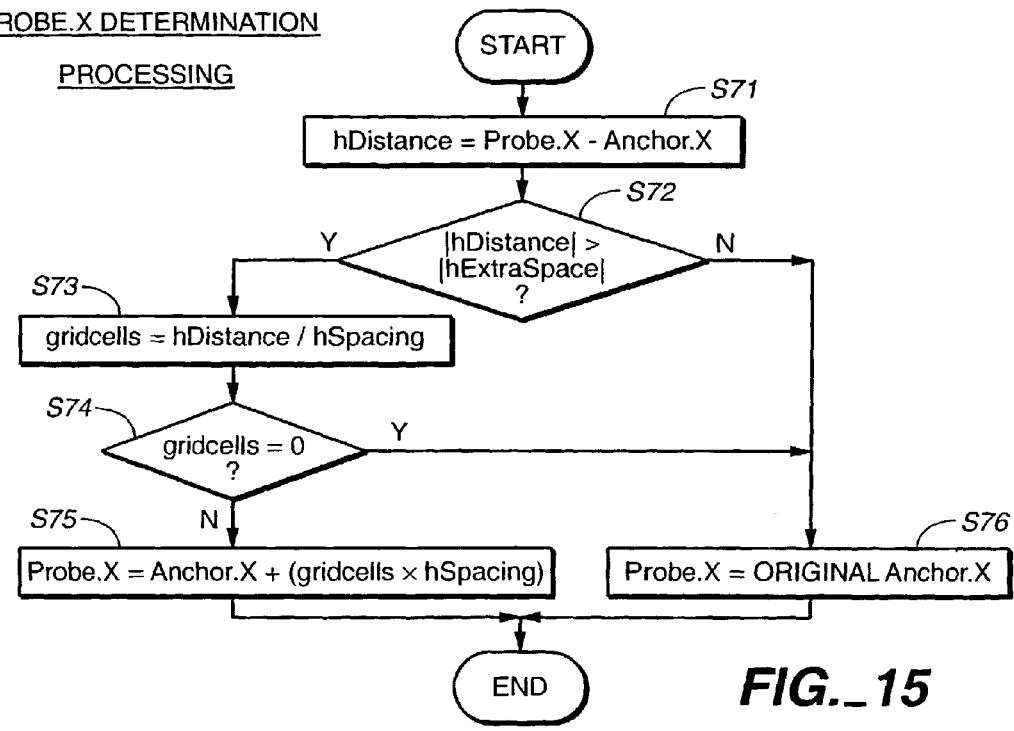
FIG._15
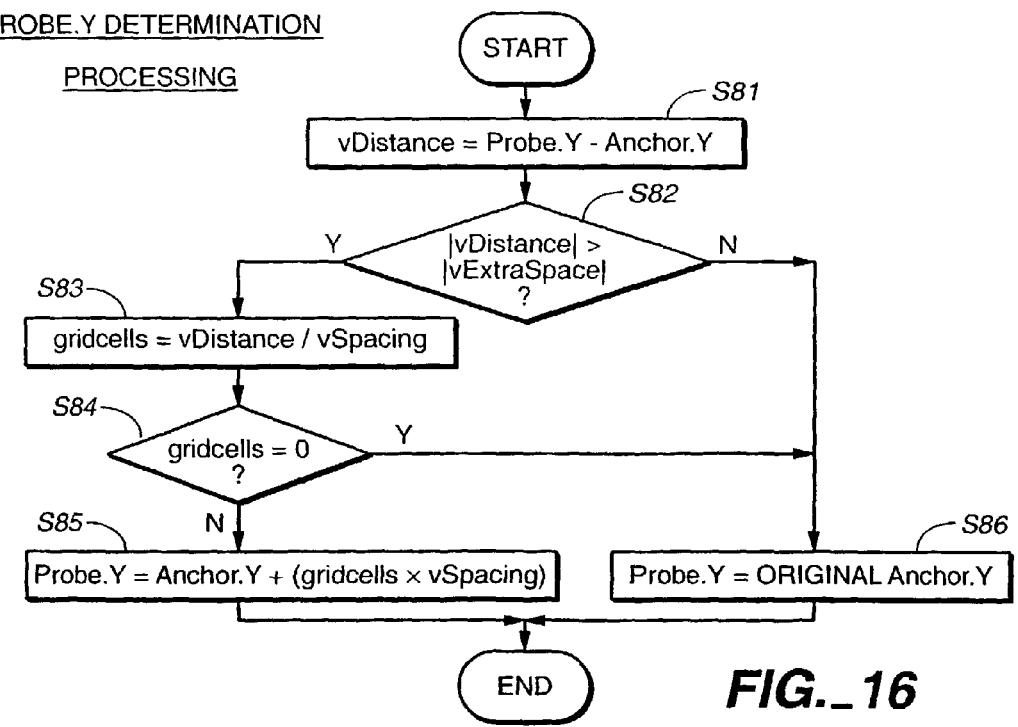
FIG._16

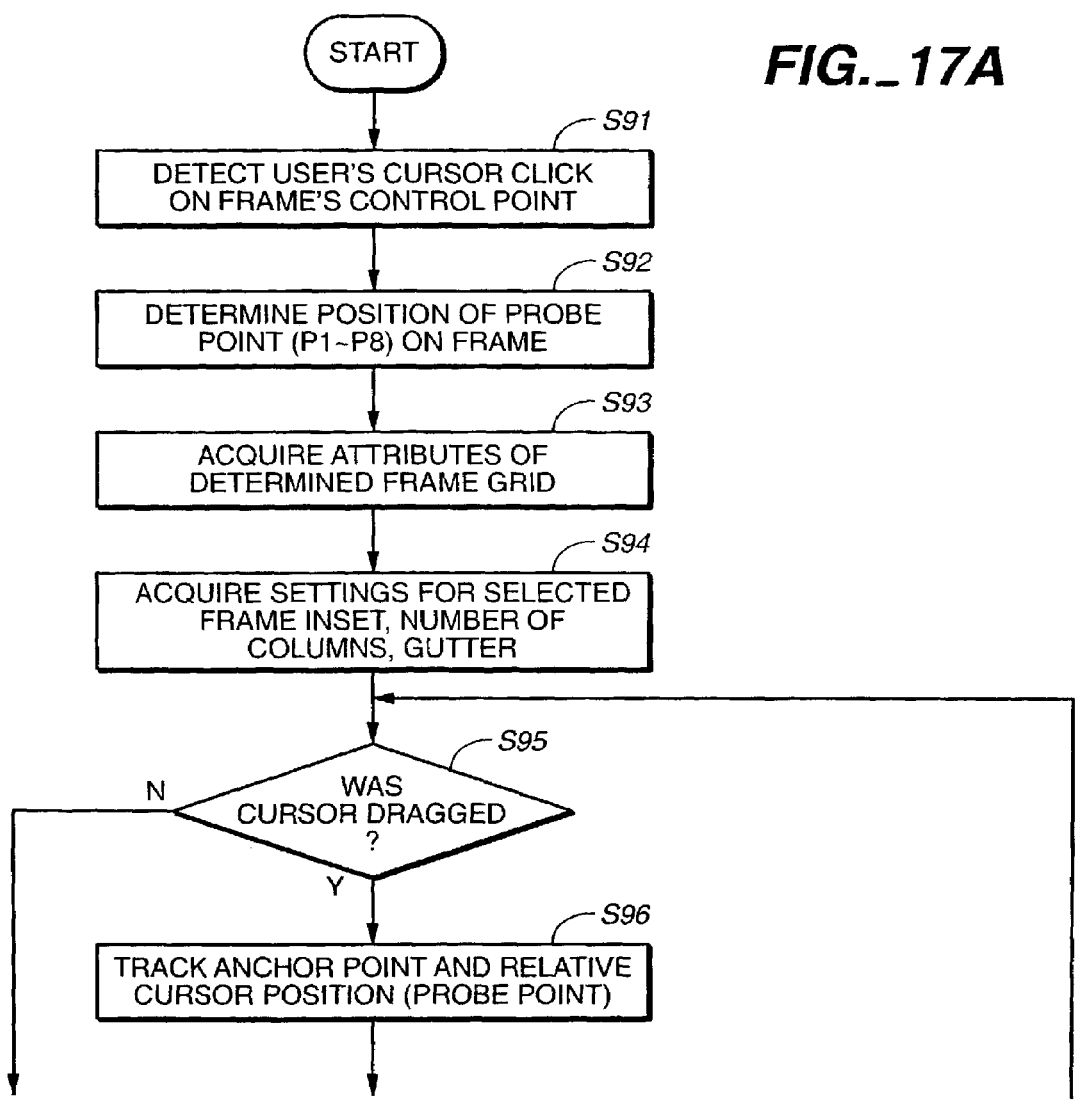

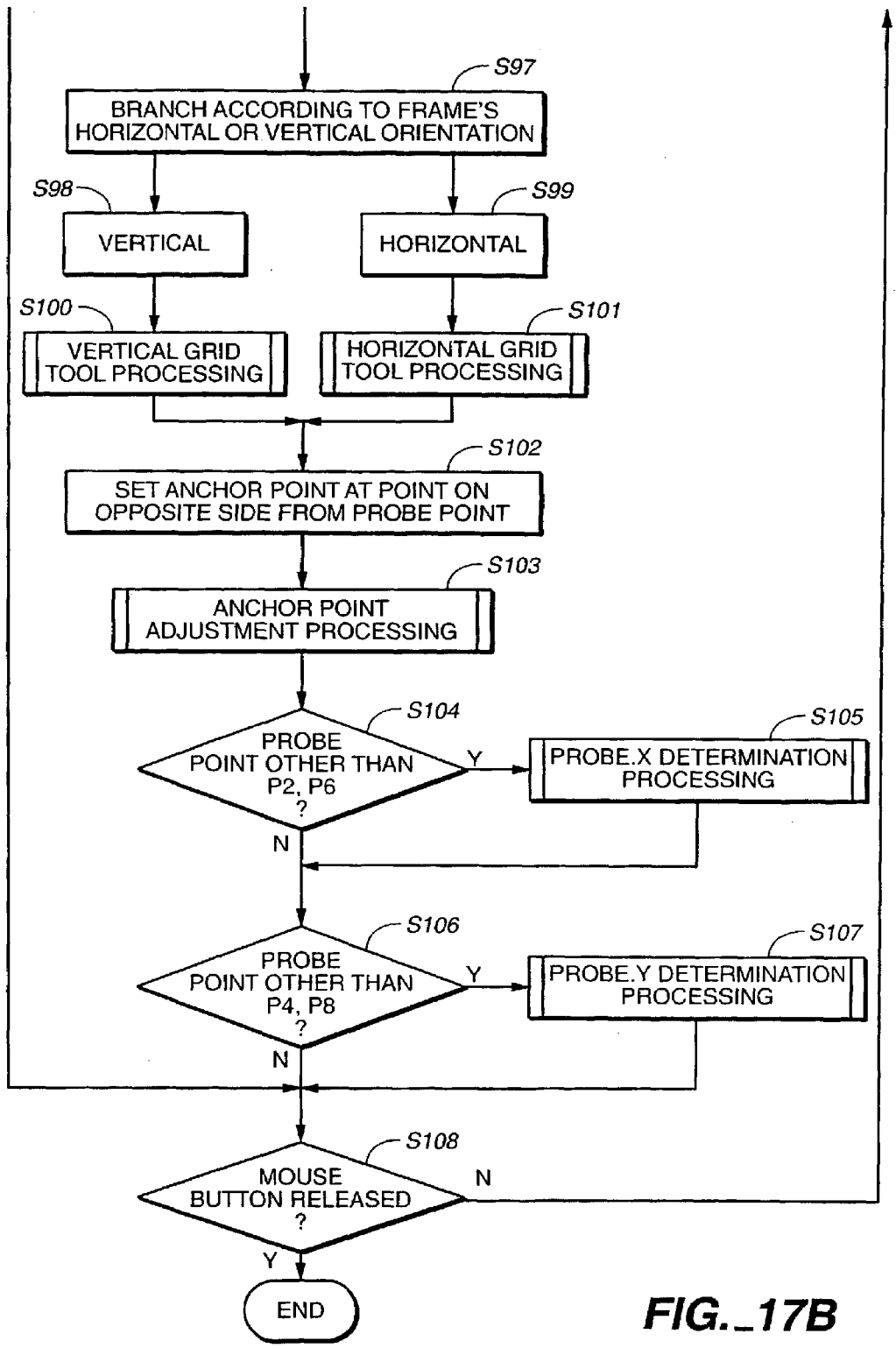
FIG._17B

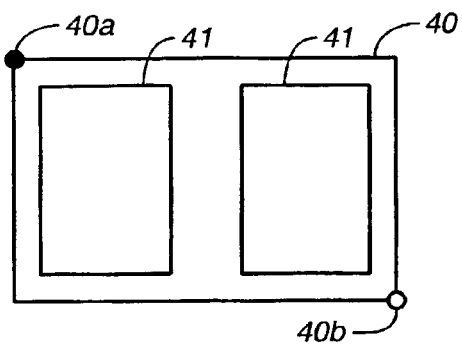
FIG._18A
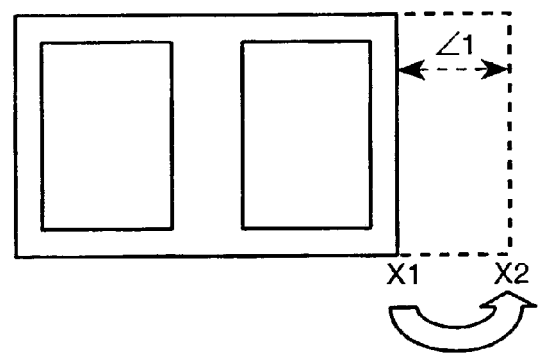
FIG._18B
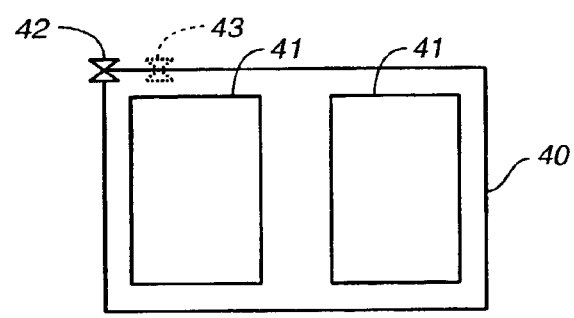
FIG._18C
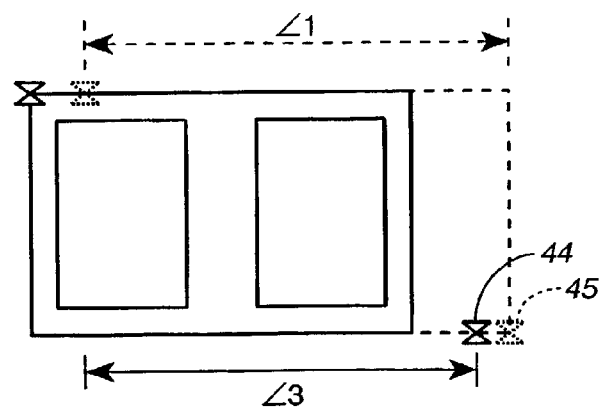
FIG._18D

TEXT GRID CREATION TOOLS

TECHNICAL FIELD

This invention relates to desktop publishing (DTP) technology, and more particularly to electronic typesetting and/or electronic layout editing technology.

BACKGROUND

In electronic typesetting various types of objects such as characters or graphics are arranged in an electronic document (work region) that is displayed on a display device, such as a CRT or LCD. When typesetting an object, reference lines known as a guide or grid are used as the standard for arranging an object at a desired location in an electronic document. When setting these reference lines in an electronic document, the user must usually determine and input the dimensions of the margin region in the electronic document in order to determine the electronic document's layout range. Although an electronic document is displayed on the screen of a display device, precisely determining the margin dimensions is an extremely difficult operation; the user is not always able to set the desired margin at the first attempt, and must often attempt to set the margin a number of times. In addition, each time the margin is set it is necessary to calculate what the margin value should be and in the preliminary stage of doing important typesetting and layout processing this presents the user with operational difficulties.

Also, in prior art, when performing typesetting and layout processing on CJK (Chinese, Japanese, Korean) font characters, which are so-called ideographic characters, there is no guide or grid that can set reference lines that can be used to set individual typesetting and/or layout attributes for each page of an electronic document, so it has been difficult to efficiently and precisely perform typesetting and layout processing with fine detail and flexibility.

In addition, in conventional electronic typesetting and layout processing, an object, known as a frame grid is used to assign a plurality of characters (for example, CJK font characters) to an electronic document in a specific arrangement. The frame grid moves the plurality of characters in the electronic document while keeping them in the specific arrangement. However, a conventional frame grid does not automatically coordinate the boundary line of the frame grid with the grid in the electronic document, and is therefore inconvenient to use.

SUMMARY

In general, in one aspect, the invention provides methods and apparatus, including computer program products, implementing and using techniques for controlling typesetting and layout editing. Data being typeset or laid out is displayed on a display. A first menu having a user-selectable first creation mode and second creation mode is displayed on the display if a new electronic document is created in accordance with a user-input control instruction. A second menu that has previously set values for grid parameters demarcating an appropriate layout grid for the new electronic document is displayed if the user selects the first creation mode. A layout grid is created in the electronic document, by receiving a user input approving the values set in the second menu, without the necessity of the user separately calculating margins.

Implementations can include one or more of the following features. Data to be typeset or laid out can further be supplied to a desktop publishing processing control device having a typesetting and layout control means. One layout grid may be created for each page of an electronic document. The values in the second menu can determine at least the layout grid dimensions and the starting point on the page corresponding to the layout grid. The layout grid can have several cells, each cell being able to accommodate one character, and the cell dimensions can have embox or ICF box dimensions corresponding to font dimensions selected in the second menu. User inputs defining margin values for the new electronic document can be received if the user selects the second creation mode, and a layout grid can be created in the electronic document based on the margin values.

In general, in another aspect, the invention provides methods and apparatus, including computer program products, implementing and using techniques for controlling typesetting and layout editing. Data is displayed during typesetting or layout processing on a display. A frame grid that provides a grid for demarcating several cells is created, the cells having the ability to keep the characters in a specific arrangement in order to arrange the characters on a page of an electronic document displayed on the display, based on user input and a boundary line demarcating a region arranged on the page. The frame grid is processed when creating the frame grid, so that the boundary line is always coordinated with cells at the edge of the frame grid.

Implementations can include one or more of the following features. A frame grid region can be determined by a user input selecting a grid tool displayed on the display with a pointing device and dragging a cursor a specified length on the page and the boundary line of the frame grid can be automatically coordinated with the plurality of cells so that the boundary line c does not intersect any cell when the selection state using the pointing device is released and the new frame grid is formed. The frame grid region can be further changed by a user input selecting a control point on a frame grid present on the page of an electronic document displayed on the display screen with a pointing device, dragging the control point a specified length, and releasing the selection state using the pointing device, after which the boundary line of the frame grid is automatically coordinated with the plurality of cells so that the boundary line does not intersect any cell. The cells can have a shape that is substantially square, and conforms to the embox or ICF box corresponding to the character font and character dimensions. The typesetting and layout control means can have a named grid storage part for storing a plurality of named grids, the grids being set with specific grid parameter values, and a new frame grid can be created based on the grid parameter values of the selected named grid when the user selects a desired named grid to create a new frame grid. A named grid palette containing a list of names of the plurality of named grids can be displayed on the display. A layout grid demarcating the layout reference on a page can be created on each page of the electronic document, the named grids can contain a named grid named "layout grid", and a frame grid can be created based on the attributes of the layout grid formed on each page when the named grid named "layout grid" is selected.

Potential advantages of the invention may include one or more of the following. A layout grid may be created efficiently and without calculating page margins. A frame grid may be created and its dimensions may be changed to always coordinate the frame and the grid. A layout grid may be created and controlled on each page of an electronic document that can be used in electronic typesetting and layout processing. A frame grid may be created or controlled that can easily and swiftly execute electronic typesetting and layout processing.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a schematic block diagram showing a DTP processing system in accordance with one implementation of the invention.

FIG. 2 is a schematic block diagram showing a DTP processing system in accordance with another implementation of the invention.

FIG. 3 is an overview of the first menu when creating a layout grid in accordance with one implementation of the invention.

FIG. 4 is an overview of the second menu when creating a layout grid in accordance with one implementation of the invention.

FIG. 5 is a flowchart showing the procedure for creating a layout grid in accordance with one implementation of the invention.

FIG. 6 is an overview showing the layout grid created in accordance with one implementation of the invention.

FIG. 7 is a flowchart showing the procedure for selecting between an embox and ICF box for the base of a layout grid in accordance with one implementation of the invention.

FIGS. 8A through 8D are all overviews showing the states for setting the grid starting point in accordance with one implementation of the invention.

FIG. 9 is an overview showing the frame grid created in accordance with one implementation of the invention.

FIGS. 10A through 10F are all overviews showing various frame grid configurations that can be created in accordance with one implementation of the invention.

FIG. 11 is a flowchart showing the procedure for creating a frame grid in accordance with one implementation of the invention.

FIG. 12 is a flow chart linked to FIG. 11.

FIG. 14 is a flowchart showing a specific routine in FIGS. 11 and 12.

FIG. 15 is a flowchart showing a specific routine in FIGS. 11 and 12.

FIG. 16 is a flowchart showing a specific routine in FIGS. 11 and 12

FIG. 17 is a flowchart showing the procedure when changing the frame grid dimensions in accordance with one implementation of the invention.

FIGS. 18A through 18D are each overviews showing the adjusted status of anchor points in accordance with one implementation of the invention.

Like reference symbols in the various drawings indicate like elements.

DETAILED DESCRIPTION

Figure 13A:
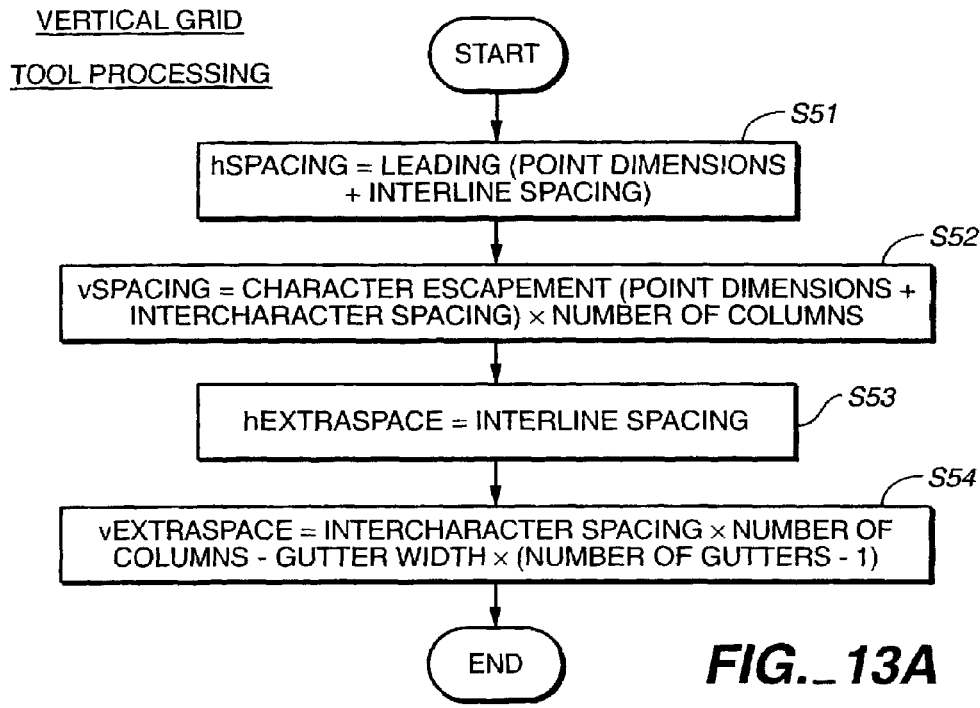
FIGS. 13A and 13B are flowcharts showing specific routines in the flowcharts of FIGS. 10 and 11.

FIG. 1 is a diagram showing an electronic typesetting DTP system in accordance with one implementation of the invention. DTP system 1 has a DTP processing control device 2, which can perform electronic typesetting and layout editing, etc.; a display device 3, which can display the data being processed; an input means 5 for inputting various types of data such as graphics, text, control instructions, etc.; and an output means 6 for outputting processed data. DTP processing control device 2 has a typesetting and layout control means 2a, which performs typesetting and layout control, and a font file 2b, which stores the font information, that is, the attributes of text to be output to a display or to a printer, etc. Font file 2b has in particular a CJK font 8, which is a font for ideographic characters such as Japanese, Chinese, Korean, etc. In addition, according to one aspect of the invention, typesetting and layout control means 2a has a layout grid processing (creation/control) means 4. The layout grid processing means makes it possible to process (create or control) a layout grid for each page of an electronic document in order to display a plurality of characters or graphic objects on display device 3 and to efficiently perform electronic typesetting and layout operations. In addition, according to another aspect of the invention, typesetting and layout control means 2a has a frame grid processing (creation/control) means 7, which makes it possible to display a plurality of characters or graphic objects on display device 3 and efficiently perform electronic typesetting and layout operations, particularly arranging a plurality of characters at a desired location in a desired arrangement.

Display device 3 can consist of various types of display devices such as a CRT or LCD, etc. Input means 5 can include a keyboard, pointing device (mouse, track ball, track pointer, etc.), scanner, transmission interface, etc. Output means 6 can include a printer, external storage device, etc. DTP processing control device 2 may include a processor such as a CPU, etc., or a memory, or an electronic typesetting and layout control program, etc. that includes a layout grid processing routine and/or a frame grid processing routine that is loaded into the memory and is processed. On the other hand, DTP processing control device 2 can also be constituted in part or in whole as hardware constituted as firmware.

FIG. 2 is a block diagram showing a DTP system 10 provided with the inventive layout grid processing (creation/ control) mechanism and frame grid processing (creation/ control) mechanism, constituted by applying the first implementation of the invention to a general-purpose computer system. That is, system 10 shown in FIG. 2 has a CPU 11, a memory 12, a CRT 13, a hard disk 14, a keyboard 15, a mouse 16, a CD-ROM drive 17, a FD drive 18, and a printer 19. These units are coupled and work together via a bus 9. In electronic editing in accordance with the invention, a layout grid processing (creation/control) program 4' and a frame grid processing (creation/control) program 7' are routines that form a part of a typesetting and layout control program 2a' together with other electronic editing programs, and are installed in system 10 via CD-ROM drive 17 or FD drive 18, and stored on hard disk 14, for example. In addition, font file 2b can also be stored on hard disk 14. Then, when the electronic typesetting and layout control program that includes this layout grid processing program 4' and/or frame grid processing program 7' is started by a user operating keyboard 15 or mouse 16, the program is loaded into memory 12 as shown in FIG. 2. Therefore CPU 11 and layout grid processing program 4' and frame grid processing program 7' loaded into memory 12 coexist and constitute layout grid processing means 4 and frame grid processing means 7, respectively. In one aspect, the invention provides a computer-readable recording medium (for example, CD-ROM, FD, tape, semiconductor memory, etc.) storing at least one of either layout grid processing program 4' and frame grid processing program 7' so that a general-purpose computer system can be converted into a DTP system providing at least one of either the inventive layout grid processing function and the frame grid processing function.

Next, the layout grid processing (creation/control) function in accordance with one implementation of the invention will be explained with reference to FIGS. 3 through 8. Furthermore, the layout grid (known as a page grid) of the invention provides reference lines when arranging text or objects such as graphics at a specified location on each page of an electronic document that is displayed on a display device, such as a CRT or LCD, etc, in electronic typesetting and layout operations. Referring to the layout grid, a user can arrange the desired object at the desired location. The layout grid is basically vertical reference lines and horizontal reference lines displayed on the screen of a display device, and the user arranges the desired object while referring to these reference lines. When arranging an object on the layout grid, the user can also create a frame on the layout grid and include characters or graphics in this frame, and to position the frame and the data contained therein at the desired location on a page by manipulating the frame. Also, in this case, if a plurality of attraction points (known as snap points) that are provided in the layout grid are activated, they attract attraction points provided in the frame grid, and the frame can be positioned at a predetermined location on the layout grid.

FIG. 6 shows part of the screen display when operating the electronic typesetting and layout control function in accordance with one implementation of the invention, for example, when the display device 3 of FIG. 1 is the CRT 13 of FIG. 2. That is, an electronic document 122 is displayed on a screen 121 as an editing form, and layout editing and typesetting of various types of page structural elements (known as objects) is performed thereon. Electronic document 122 can be displayed on screen 121 by clicking with a mouse on "file," 125*a*, for example, in a menu bar 125 displayed along the top edge of screen 121, and selecting "new document". Furthermore, only one page is displayed in the example shown in the drawing, but electronic documents with a plurality of pages can be created.

In one implementation of the invention, when a user clicks "file" 125*a* and selects "new document" in a displayed pulldown menu, before displaying electronic document 122 on screen 121, a "new document" dialog box 20 is displayed to the user as the first menu as shown in FIG. 3. First menu 20 shown in FIG. 3 displays only the parameters needed to explain the invention, and can include other parameters than these as desired. First menu 20 in this example shows a case in which the number of pages is "1", the page dimensions are "letter", its width is "51p0" and its height is "66p0". Furthermore, if the "number"+"p"+"number" expression in the first menu is "3p6", for example, it means 3 pica 6 points, and in this case 51p0 means the number is equal to a value of 612 points. Furthermore, this value can also be expressed in "points", "mm", "inches", etc., of course, and can be set in the unit that is preferred by the user.

In addition, what is important in first menu 20 in the form of the dialog box of FIG. 3 is that the dialog box provides buttons for selecting "layout grid" mode and "margin/column" mode to create a document. As indicated by the dotted line surrounding the "layout grid" button, "layout grid" mode is set as the default selection. Therefore, if the user presses the return key, for example, in the state shown in FIG. 3, a new document is created in "layout grid" mode. On the other hand, if selecting "margin/column" mode, the user first selects the "margin/column" button with a mouse, or presses a specified key to select "margin/column" mode, and then presses the return key, for example, and a new document is created in "margin/column" mode. Furthermore, in this "margin/column" mode the user needs to calculate and set an appropriate value for margins on the page of the electronic document, so this resembles the mode when creating a new document in a conventional electronic document. Therefore a detailed explanation of the "margin/column" mode will not be given here.

When a user presses the return key with the first menu 20 of FIG. 3 set as described above, "layout grid" mode is selected and second menu 21, with the dialog box format shown in FIG. 4, is displayed on the screen of the display device. The second menu 21 of FIG. 4 also displays only the parameters that are particularly important for the invention; of course it is possible to add other appropriate parameters to second menu 21. The second menu 21 shown in FIG. 4 shows that it is possible to set parameters such as "orientation", "font", "dimensions", "intercharacter spacing", "character scale", "line scale", "interline spacing", etc. as grid settings. In this case "orientation" refers to the attribute describing whether the plurality of cells constituting the layout grid has text written horizontally or written vertically. The text is "horizontal" in the example shown in the drawing, so the layout grid is a layout grid for horizontal writing, while if "vertical" were set, a layout grid for vertically written text would be formed. Next, font ("Ming-Dynasty style" in this example), dimensions ("12 point" in this example), intercharacter spacing (also known as "character spacing"; "0pt" in this example, i.e. zero space between characters), and character scale ("100%" in this example) are parameters that determine the horizontal positioning and dimensions of the plurality of cells in the layout grid. Also shown as grid settings are line scale ("100%" in this example) and interline spacing (also known as "line spacing"; "6pt" in this example, i.e. 6 points); these parameters determine grid cell spacing and vertical dimensions.

In addition, in the second menu 21 of FIG. 4. the number of characters ("45" in this example), number of lines (also known as line number; "40" in this example), number of columns ("1" in this example), and gutter ("1p0" in this example) are set as line and column setting items. "Number of characters" is the number of characters in one line (i.e., a "line"), and thus the number of grid cells. "Number of lines" is the number of lines in the layout grid. "Number of columns" is the number of columns, and is the region within the layout grid divided by a "gutter" (also known as "intercolumn spacing"). In the example shown in the drawing, the number of columns is "1", so there is no gutter in the layout grid. Therefore in this example the gutter value "1p0" is in fact not applied.

Next, in second menu 21 shown in FIG. 4, it should be noted that "grid starting point" is provided as a setting item. "Top", "bottom", "outside", and "inside" are provided as setting items for the grid starting point, and it is possible to set the appropriate values with each setting item. The "grid starting point" item determines the arrangement and position of the layout grid on the page. "Grid starting point" is ideally embedded in second menu 21 in pulldown menu format, and the example shown in this case is a combination of "top/outside", but other possible combinations include "top/inside", "bottom/outside", "bottom/inside", etc., and in addition selection branches such as "top bottom centered", "left right centered", "top bottom left right centered", etc. can be provided. This grid starting point can be included in one layout grid setting item in second menu 21, so a layout grid can be formed on a page without the necessity of the user calculating margins; this point will be described later in additional detail.

FIG. 5 is a flowchart showing the processing flow in the layout grid formation method in accordance with one implementation of the invention. First, step S1 identifies whether or not the user selected "new document". For example, as described earlier, the user starts the electronic typesetting and layout processing function and clicks on "file" 125a displayed on screen 121 of the display device as shown in FIG. 6, and a pulldown menu is displayed from which the user selects "new document". In this case the decision result in step S1 is affirmative, and first menu 20 in the dialog box format shown in FIG. 3 is displayed (step S2). When the new document parameters are set in first menu 20 (step S3) and a new document is created on screen 121 (step S4), either layout grid dialog box 21 (step S6) or a margin/column dialog box (step S9) is opened as the second menu according to the mode selected in first menu 20. As explained earlier, if the layout grid mode is selected, layout grid dialog box 21 is opened as the second menu, and the setting items for the layout grid itself are set (step S7). In this case only the parameters determining the contents of the layout grid itself are set; the user does not need to calculate the margins and so forth surrounding the layout grid. In this implementation of the invention, the margin is determined as the portion of the page remaining after setting the contents of the layout grid. In this manner a layout grid is formed on each page of the document. On the other hand, if "margin/column dialog box" is selected (step S9), it is necessary to calculate the margins at the top and bottom and left and right sides of the page and set the appropriate values (step S10).

In this manner, layout grid 123 is formed on page 122 of an electronic document as shown in FIG. 6. In the example shown in the drawing, layout grid 123 is a manuscript paper format for horizontal writing, but it is also possible to constitute grids with a variety of formats, such as manuscript paper for vertical writing, graph paper format, etc. For example, if interline spacing were set as zero in layout grid 123 in FIG. 6, a grid structure with a graph paper format would be produced. In addition, in the FIG. 6 implementation the intercharacter spacing is set as zero, but if the intercharacter spacing were set a value larger than zero a gap would be formed between pairs of adjacent cells arranged within each line. In this manner layout grids can be formed with various structures by suitably setting parameters such as interline spacing and intercharacter spacing and the like in the layout grid. Layout grid 123 usually is constituted as a grid structure using a plurality of vertical lines and a plurality of horizontal lines, thereby demarcating a plurality of grid cells. Each grid cell is basically square, but rectangular cells can be obtained. One character can be assigned to each grid cell. Therefore layout grid 123 can be used as a reference when assigning a plurality of characters to a page.

Incidentally, as shown in FIG. 6, other menu items can be provided on display device screen 121 in addition to "file" 125a in menu bar 125, such as "edit" 125b or "layout" 125c, etc. For example, if "edit" 125b is selected, a pulldown menu is displayed and it is possible to copy the data currently being processed. In addition, if "layout" 125c is selected, a pulldown menu appears, and a layout grid setting menu in dialog box format is displayed on the pulldown menu, for example, and appropriate values can be set. In addition, a tool box 126 is displayed on screen 121 in FIG. 6. A number of tools that can implement various functions the user desires, as indicated by the various icons, are included in tool box 126. In particular, to explain tools related to the invention, frame grid creation tool 126c for the vertical writing manuscript paper format and frame grid creation tool 126b for the horizontal writing manuscript paper format are provided.

When the user uses the mouse and clicks frame grid creation tool 126b for the horizontal writing manuscript paper format in tool box 126, and then drags the mouse diagonally across the desired length on screen 121, the user can create a frame grid that has the same attributes and structure as layout grid 123 on layout grid 123. Then a plurality of characters can be arranged in a specified arrangement within this frame grid, the frame grid can be arranged at the desired location on the layout grid, and layout processing can be performed. A frame grid formed on layout grid 123 in this manner can be selected by the user clicking selection tool 126a with the mouse and then clicking on the desired frame grid with the mouse.

In addition, as shown in FIG. 7, the inventive layout grid 123 can set each grid cell to be the same size as the embox or ICF box for the font and dimensions selected for that layout grid. Therefore, in the layout grid 123 in accordance with the invention the user can select to base the grid cells on an embox or an ICF box. Furthermore, if the selected font dimensions are 12 points, for example, the embox is an essentially square outer frame with both a width ; and a height of 12 points, and corresponds to a so-called "imaginary body". In addition, with ICF box (also known as "ideographic character face") the selected font is an average bounding box. That is, one character of a given font has a glyph which constitutes that character, but there is a rectangular frame that is nearly square defined by the pair of horizontal lines which touch the top and bottom of that glyph and by the pair of vertical lines which touch the farthest right side and the farthest left side of the glyph, and the frame is positioned inside the embox. In a specific font the bounding box is different for each character, but what is determined as the average bounding box for that font is the ICF box. In particular, typesetting of CJK fonts is conventionally performed by making the top, the bottom, or the middle of the embox a coordination point and coordinating this coordination point with a reference line. However, for certain fonts, when the characters are large, the appearance is sometimes better when characters are coordinated and arranged using the bottom of ICF boxes instead of the bottom of emboxes. Therefore, depending on the type or dimensions of the characters to be laid out, it is sometimes better to base layout grid 123 on ICF boxes instead of emboxes. The flowchart shown in FIG. 7 shows that the layout grid 123 can be selectively based on an embox or an ICF box. Furthermore, to be specific, a procedure can be provided for selecting embox/ICF box as one item in a pulldown menu under "file" 125a in menu bar 125, for example.

Next, a procedure for creating a layout grid referenced on the grid starting point, which is another feature of the invention, will be explained with reference to FIGS. 8A-8D. FIGS. 8A-8D are all examples of creating layout grids in each page of a two-page double-page electronic document. In FIG. 8A the grid starting point is "top/inside" mode, and is a case in which the grid starting point is set 1.5 cm, for example, from the inside, and 2 cm, for example, from the top of the page (i.e., from the "node"). In this case the user does not set "bottom" and "outside". In FIG. 8B the grid starting point is "bottom/inside" mode, and is a case in which the grid starting point is set 1.5 cm, for example, from the inside (i.e., node), and 2 cm, for example, from the bottom of the page. In this case "top" and "outside" are not set by the user. Next, FIG. 8C is a case in which "top bottom centered" is set as the grid starting point with "outside" set as 1 cm, for example; inside, top, and bottom are not set by the user. In addition, FIG. 8D is a case in which "left right centered" is set as the grid starting point with "top" set as 3 cm, for example; in this case inside, outside, and bottom are not set by the user. In this way, according to this aspect of the invention, when determining the dimensions of the layout grid the user simply sets a setting item on a menu in the form of a layout grid box and does not need to calculate margins at the top and bottom and left and right sides of the page in an electronic document. The margins of a page are automatically determined as the region remaining on the page around the set layout grid. Therefore, in practice, the user can simply study the layout grid region where layout or typesetting operations are to be performed and set an item demarcating that region, and does not need to do troublesome margin calculations. This greatly simplifies the procedure for creating a layout grid and greatly improves the ease of using an electronic typesetting and layout program.

Next, the frame grid processing technology in accordance with another aspect of the invention will be explained. A frame grid is an object comprising a frame—i.e., a frame itself—and the grid contained therein. Typesetting and layout processing is performed by arranging characters in a specified arrangement inside a plurality of grid cells demarcated by a grid and arranging the grid frame at a specified location on layout grid 123 as explained previously. That is, as shown in FIG. 9. the frame grids 30 and 31 in accordance with the invention have a basically rectangular shape, and comprise a plurality of grid cells forming a grid therein. One character can be positioned in each grid cell. Frame grids 30 and 31 are arranged on layout grid 123, and can be moved to the desired location by selecting and dragging the desired frame grid using selection tool 126a in tool box 126, for example. In this case layout grid 123 can be moved while keeping the stance pictured in frame grids 30 and 31, and additionally, when the attraction (snap) mode is on, the frame grid moves while being sporadically attracted to a plurality of attraction points provided on layout grid 123.

In the example shown in FIG. 9, frame grid 30 is a horizontal writing grid formed by dragging grid tool 126b, and frame grid 31 is a vertical writing grid formed by dragging grid tool 126c. Furthermore, frame grid 30 is selected by clicking with selection tool 126a, for example, and this status is indicated by the appearance of eight handles (also known as "control points") 32a-32h on the frame of frame grid 30. These eight handles can act as attraction points to be attracted to attraction points on layout grid 123 when moving frame grid 30 on layout grid 123, for example. In addition, they can act as points for changing the dimensions of the frame grid. Frame grid 31 is not selected, so its eight handle points are concealed.

These frame grids 30 and 31 can be formed by selecting grid formation tools 126b and 126c in tool box 126 and dragging them on layout grid 123, and in this case, according to the invention, their grids are formed in complete coordination with their frames, as shown in FIG. 9, when frame grids 30 and 31 are formed. In other words, when forming frame grids 30 and 31, the frame itself matches the periphery of the outermost cells of the plurality of grid cells that the frame encompasses, and does not partially intersect any cell. In addition, in a preferred implementation of the invention, when frame grids 30 and 31 are formed the default is to form them by inheriting the attributes of layout grid 123 (this too constitutes one feature of the inventive frame grid). Therefore, as shown in FIG. 9, layout grid 123 is for horizontal writing, so frame grid 30 for horizontal writing has a configuration that perfectly matches part of the layout grid. Furthermore, when creating frame grid 30, there are instances in which the position of frame grid 30 is not perfectly coordinated with the position of layout grid 123 due to the track through which the user drags it on layout grid 123. Nevertheless, if attraction mode has been set, frame grid 30 is attracted by layout grid 123 and its position is perfectly coordinated with that of layout grid 123 as shown in FIG. 9 by selecting the formed frame grid 30 with selection tool 126a and moving the frame grid over layout grid 123. Therefore, as shown in the frame grid 30 of FIG. 9, frame grid 30 is perfectly coordinated with the position of layout grid 123, so when characters are entered in frame grid 30 the characters are arranged in the respective grid cells of frame grid 30, and the user can immediately decide if the layout is good or bad.

Furthermore, vertical writing frame grid 31 does not perfectly coincide with layout grid 123 since layout grid 123 is for horizontal writing. That is, in layout grid 123 the intercharacter spacing is zero in each line (line), but the interline spacing (line spacing) between adjacent lines is set as a specific positive value. Frame grid 31 is different from layout grid 123 with regard to vertical writing but otherwise has the same attributes, so frame grid 31 is in the same state as if part of layout grid 123 were rotated 90°. Therefore if layout grid 123 is rotated 90° and set for vertical writing, vertical writing frame grid 31 will match perfectly.

In addition, as described earlier, the dimensions of each frame grid 30 and 31 can be changed by holding any one of handles 32a-32h, but according to another feature of the invention, even if the dimensions of frame grids 30 and 31 are changed in this way the interior frame is always automatically corrected in the post-change frame grid, and the frame grid's frame and grid are always kept in a coordinated state. This achieves very striking effects in performing frame grid layout operations on layout grid 123.

In addition, according to another aspect of the invention, once frame grids 30 and 31 have been created their attributes (nearly the same setting items as the setting items of layout grid 123 etc.) can be named and stored in the memory in table form, and later appropriate selections can be made from the table and the previously set frame grid attributes can be used to create a new frame grid that has the same attributes. In addition, a special named grid called the "layout grid" is stored in this table, and if the layout grid is selected frame grids can be created according to the layout grid attributes of the corresponding page. In this case, for example, in an electronic document with a plurality of pages, if a different layout grid is set for each page and layout processing is performed in sequence for each page, simply by selecting the "layout grid" named grid for each page, frame grids are automatically formed that have the same attributes as that page, so layout operation efficiency is dramatically increased.

Next, another aspect of the inventive frame grid will be explained with reference to FIGS. 10A-10F. A feature of the frame grid is that various grid structures that are the same as the layout grid can be set. First, to explain the case shown in FIG. 10F, two columns 31a and 31b are set in frame grid 31, and a gutter (intercolumn spacing) 31c is set between them. Three lines (lines) are set in the upper column, column 31a, while two lines are set in the lower column 3b. Three grid cells are set in each line in upper column 31a, and two grid cells are set in each line in lower column 31b. Intercharacter spacing (character spacing) 31f is set between adjacent pairs of grid cells in each line, and interline spacing (line spacing) 31g is set between adjacent pairs of lines. Each grid cell has height 31d and width 31e, and these are usually the same, so each grid cell is essentially square in shape. In addition, as is the same with the layout grid, each grid cell can be based on either an embox or an ICF box.

FIG. 10A shows a frame grid for horizontal writing having two columns, left and right, and FIG. 10B shows the frame grid with eight handles (control points) appearing on the frame when the frame grid is selected. In addition, FIG. 10C is a frame grid when interline spacing and intercharacter spacing are set to the same value, and FIGS. 10D and 10E are frame grids 31 for vertical writing; FIG. 10D has one row and FIG. 10E has two rows. In this way the invention's frame grids 30 and 31 can take various configurations, so the layout operation is very efficient and can provide a multiplicity of forms.

Next, referring to FIGS. 11 through 16, the procedure for processing the frame grid so that frame and grid are automatically coordinated when creating a grid frame in accordance with the invention will be explained. As shown in FIG. 11, first, the procedure detects that the user flat selected grid tool 126c or 126b (step S20). Next, the procedure detects the user's cursor click (step S22), and it sets the XY position of the cursor at that time as the anchor point for the new frame grid (step S23). Next, the procedure decides whether or not a named grid in the named grid palette stored as a table in memory as described earlier was selected by the user (step S24). If the decision result is affirmative, the procedure acquires the attributes of the current document's default grid (step S25), and acquires the setting values for the default frame inset (margin), number of columns (column), and gutter (intercolumn spacing) (step S27). On the other hand, if the decision result in step S24 is negative, the procedure decides whether or not the layout grid in the named grid palette is selected (step 26), and if affirmative, the procedure acquires the selected named grid's grid attributes (step S28), and moves to the previously described step S27. On the other hand, if the decision result in step S26 is negative, the procedure acquires the current page number (step S29), and then acquires the attributes of the layout grid for the current page (step S30), and subsequently moves to the previously described step S27.

Figure 13B:
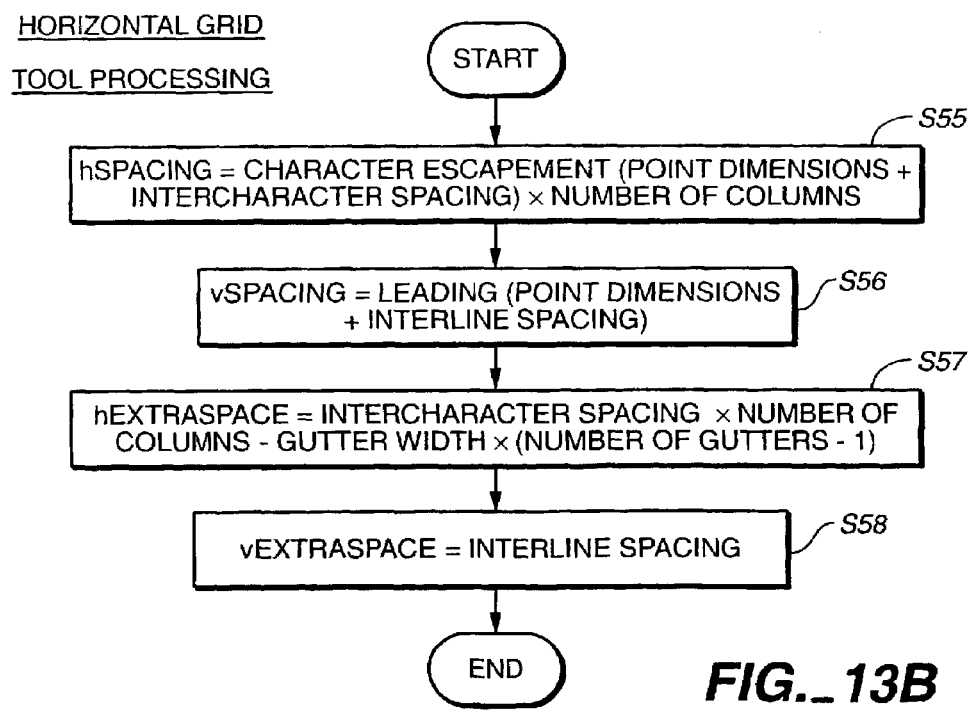

Next, as shown in FIG. 12, the procedure decides whether or not the user dragged the cursor (step S31), and if the cursor was dragged, the procedure tracks the cursor position (probe point) relative to the anchor point (step S32). Next, the procedure checks whether the grid tool selected by the user is vertical (for vertical writing) or horizontal (for horizontal writing) (step S33). If the grid tool is vertical (step S34), vertical grid tool processing (step S36) is performed, and if the grid tool is horizontal (step S35), horizontal grid tool processing (step S37) is performed. For vertical grid tool processing, as shown in FIG. 13A, leading (point dimensions+interline spacing) is set as hSpacing (step S51), character escapement (point dimensions+intercharacter spacing)×number of columns is set as vSpacing (step S52), interline spacing is set as hExtraSpace (step S53), and intercharacter spacing×number of columns−gutter width× (number of gutters−1) is set as vExtraSpace (step S54). On the other hand, as shown in FIG. 13(B), for horizontal grid tool processing, character escapement (number of points+ intercharacter spacing)×number of columns is set as hSpacing (step S55), leading (number of points+interline spacing) is set as vSpacing (step S56), intercharacter spacing×number of columns−gutter width×(number of gutters−1) is set is hExtraSpace (step S57), and interline spacing is set as vExtraSpace (step S58).

Next, referring to FIG. 12, anchor point adjustment processing is performed (step S38). This is shown in FIG. 14 where, first, the value for hExtraSpace from the previous step becomes the initial value, and (left inset+right inset) is subtracted therefrom to determine the new hExtraSpace (step S61). Next, in the same manner, the value for vExtraSpace from two steps previous becomes the initial value, and (top inset+bottom inset) is subtracted therefrom to determine the new vExtraSpace (step S62). Next, the probe point's X coordinate value, Probe.X, and the anchor point's X coordinate value, Anchor.X, are compared (step S63). and if Probe.X is larger than Anchor.X, hExtraSpace is subtracted from Anchor.X (step S64), while if Probe.X is less than Anchor.X, hExtraSpace is added to Anchor.X (step S65). Then the same processing is performed on the respective Y coordinate values of the probe point and the anchor point (steps S66-S68).

Returning to FIG. 12, the flow shifts to step S39, where the Probe.X determination processing shown in FIG. 15 is performed, and then the flow shifts to step S40 in FIG. 12, and the Probe.Y determination processing shown in FIG. 16 is performed. Furthermore, the Probe.X determination processing procedure (steps S71-S76) in FIG. 15 and the Probe.Y determination processing procedure (steps S81-S86) in FIG. 16 are simple calculation procedures, and are obvious from the flowcharts in FIG. 15 and FIG. 16, so a detailed explanation thereof will be omitted. Next, the flow shifts to step S41 in FIG. 12, and the procedure decides whether or not the mouse button was released by the user. If the result is negative the flow returns to step S31 and the FIG. 12 procedure is repeated again. On the other hand, if the mouse button was released, the procedure in FIG. 12 ends, and as a result frame grid 30 or 31 is created on layout grid 123. In this case, as described above, the relative positional relationship between the anchor point (the initial cursor position) and the probe point (the cursor position after movement) and the attributes of the frame grid to be created are comprehensively checked, so if the user releases the mouse button and a frame grid is created, that frame and grid are formed in a perfectly coordinated state.

Next, with reference to FIG. 17. the procedure for keeping frame and grid always automatically coordinated in accordance with the invention, even if the dimensions of the frame grid are changed once the frame and grid has been created, will be explained. Furthermore, in this case there are many routines that duplicate the routines for creating the new frame grid described earlier, so a shared flowchart will be substituted for the duplicate routines.

First, as shown in FIG. 17, the procedure determines which control point P1-P8 (these correspond to 32a-32h, respectively, in FIG. 10(B)) the user clicked of the eight control points (handles) on the frame grid (steps S91, S92). The flow determines which frame grid the user is trying to change the dimensions of, or which handle (control point) of the frame grid the user is dragging. Furthermore, "control point" here refers to the handle (control point) the user is currently selecting and holding and moving. The next steps, S93 and S94, acquire data regarding the grid inside the frame grid (attributes pertaining to character point dimensions, intercharacter spacing, etc.) and data regarding other frame attributes that determine where a cell is located within a frame. In particular, data regarding number of columns, gutter dimensions (space between two columns, i.e. intercolumn spacing), inset (space between frame boundary and text region within the frame, i.e. frame margin), etc. At this point in time the unknown parameter is the final frame dimensions. That's because the user is in the process of moving the frame's control point and changing the frame dimensions.

Next, the flow shifts to step S95, and the procedure decides whether or not the user dragged the cursor. If the result is affirmative, the flow shifts to step S96, and the procedure tracks the cursor position (probe point) relative to the anchor point. Furthermore, "anchor point" here is the control point (handle) on the frame relative to the probe point moved by the user. Therefore, if the user makes one of the four corners of a frame the probe point, the corner diagonally opposite it is the anchor point. And if the user selects a side handle (32b, 32d, 32f, 32h) instead of a corner, the anchor point is the handle on the opposite side of the frame.

Next, the flow shifts to step S97, and the procedure determines if the frame orientation is horizontal (for horizontal writing) or vertical (for vertical writing). If the frame orientation is vertical (step S98), the leading (i.e., the distance between the top of one line and the top of the next line) must be considered in order to know the position of cells in that direction as the cursor moves horizontally. When the cursor moves vertically the character escapement (i.e., the distance between the top of one cell and the top of the next cell on the same line) must be considered, but that must be multiplied by the number of columns defined for that frame. Character escapement is the same integer as the number of columns, but the number of characters per column and the number of lines per frame change when changing the frame dimensions.

Next, to explain about hExtraSpace and vExtraSpace in vertical grid tool processing (step S100) and horizontal grid tool processing (step S101), if the cursor moves horizontally and the frame is vertical—that is, for vertical writing—when the final line is reached that interline spacing (line spacing) must be cancelled since there is no interline spacing after the last line of the frame. Therefore hExtraSpace=interline spacing.

Similarly, there is no intercharacter spacing after the final character in a column, so the character becomes "intercharacter spacing×number of columns", and the character constitutes part of the vExtraSpace formula for a vertical (vertical writing) frame. Another part of the vExtraSpace calculation for a vertical frame subtracts the width of all the gutters (intercolumn spacing) in the frame. Within a frame the total number of gutters (intercolumn spacing) is always smaller than the total number of columns, so the calculation is "gutter width×(number of columns−1)".

Next, the flow shifts to step S102 in FIG. 17. Here, when the anchor point becomes known, the control points must be adjusted with regard to the non-existing line and character spacing, gutters, and insets. Next, the flow shifts to step S103 in FIG. 17, and the anchor point adjustment processing shown in FIG. 14 is performed. That is, steps S61 and S62 of FIG. 14 takes into account the frame region that is dominated by frame insets (margins). When the cursor moves horizontally, it is necessary to consider the left and right insets (step S61), whereas when the cursor moves vertically it is necessary to consider the top and bottom insets (step S62). The following step, S63, is a step that determines which direction the cursor is moving. The user can grab the bottom right corner of the frame and drag the corner that the corner becomes the top left corner of the frame. The decision result of step S63 clarifies whether the Anchor.X point should be close to or distant from the probe point. Later the same applies to Probe.Y. Next, the flow shifts to adjusting Anchor.X. In this case, it should be noted that the actual control point on the frame is not adjusted. The ultimate object is merely to perform calculations so that the probe point determines the snap (attraction) sites.

The size of the space dominated by "non-existent spacing", insets, and column gutters created by the presence of columns has been determined, so by moving the Anchor.X position that space can be reserved. Next, when the distance the user has moved the cursor becomes known (hDistance), hExtraSpace is subtracted from hDistance, and the result is equal to the size of the space wherein cells can be equally arranged according to the point dimensions and intercharacter spacing (incidentally, space for gutters, insets, etc. is already reserved, so those do not have to be the first things considered). Therefore the cursor (probe point) is attracted (snapped) to the appropriate location, and the frame is drawn.

Next, to explain step S104 and S106 in FIG. 17, when changing the dimensions of a frame these steps indicate procedures to determine if the change is horizontal, vertical, or in both directions. If the user selects a control point other than P2 or P6 on a frame (i.e., other than 32b, or 32f in FIG. 10(B)) the frame's dimensions are being changed in the horizontal direction, so the cursor needs to be restricted to allowed positions in that direction (the frame is coordinated with grid d). On the other hand, if the user selects any point in step S106 (i.e., other than 32d and 32h in FIG. 10(B)), this means the frame's dimensions are being changed in the vertical direction, so the cursor needs to be restricted to allowed positions in that direction.

Next, the Probe.X determination processing (step S105 in FIG. 17) is shown in FIG. 15. First, the horizontal distance moved by the cursor is determined in step S71. Next, step S72 decides whether or not this distance is larger than the distance determined by the hExtraSpace calculation formula. If the distance is not larger than the distance determined by the hExtraSpace calculation formula, the probe point is set at the location of the original anchor point since there is not enough room to draw the narrowest frame. In other words, the user has not provided enough space to apply to the number of columns or lines provided with at least one cell respectively. On the other hand, if the horizontal distance moved by the cursor is larger than the distance determined by the hExtraSpace calculation formula in step S72, the horizontal moved distance is divided by the previously determined value for hSpacing, thus making it possible to calculate the number of grid cells that can be assigned. Next, this grid cell number is multiplied by the value for hSpacing, and provides the absolute distance which should be measured from the anchor point. This position is the cursor attraction (snap) position. Thus, when the user releases the mouse button (step S108), the frame dimension change procedure ends. Furthermore, the Probe.Y determination processing procedure in FIG. 16 is the same as described above, except that the direction is different.

As described above, even when the frame grid dimensions are changed, the frame and the grid therein are always automatically kept coordinated.

Next, a specific example of changing frame grid dimensions will be explained with reference to FIGS. 18A through 18D. Frame 40 in FIG. 18A has two columns 41, a 4-point gutter (intercolumn spacing), and 8-point insets as left and right margins. In addition, the characters are 8 points, the intercharacter spacing is 2 points, and the frame is 156 points wide. The top left control point of frame 40 is the original anchor point 40a, and the bottom right control point is probe point 40b. As shown in FIG. 18B, the user only dragged the probe point distance L1 (32 points) from X1 to X2. The distance from anchor point to probe point becomes 188 points. Next, as shown in FIG. 18C, Anchor.X moves +16 points in accordance with step S64 in the anchor point adjustment processing procedure. Then overall hExtraSpace=−16 points. That is because there are 4 points of spacing (2 points×2 columns), the 4 point gutter is subtracted from that the 4 points of spacing, the 8 point left inset is subtracted, and the 8 point right inset is subtracted. Therefore, as shown in FIG. 18D, when hDistance=L2 (172 points) is divided by hSpacing (character escapement of 20 points because of (8 points+2 point spacing)×2 columns), the number of grid cells is 8, so 8×20 (hSpacing)=160 points (=L3). Therefore, ultimately Probe.X=Anchor.X+160 points. That is, as shown in FIG. 18D. the user actually dragged to point 45, but the cursor actually snaps to point 44. As a result, the frame and grid (cells) therein are kept in a coordinated state.

The invention may be implemented as a typesetting and layout editing control system, as a layout editing control method, or as a computer-readable recording medium storing a layout grid processing program to be executed by a computer in accordance with the invention.

A number of implementations of the invention have been described. Nevertheless, it will be understood that various modifications may be made without departing from the spirit and scope of the invention. Accordingly, other implementations are within the scope of the following claims.

What is claimed:

1. A method for controlling typesetting and layout editing, comprising:
    receiving a user input to create a new electronic document;
    displaying a first dialog box having a layout grid mode on a display;
    creating the electronic document;
    displaying a second dialog box that includes user modifiable values for a plurality of grid parameters for a layout grid for the new electronic document if the user selects the layout grid mode, the grid parameters including a plurality of parameters for defining typesetting attributes of the layout grid according to a content to be typeset;
    generating one or more layout grids within the electronic document, where generating the one or more layout grids within the electronic document includes:
        creating a layout grid for a page in the electronic document using user-inputted values for the plurality of grid parameters, the grid parameters defining a grid starting point and dimensions, the layout grid defining a particular arrangement of grid cells and providing a guide for positioning a plurality of characters for typesetting; and
        using the grid parameters of the layout grid to determine the margins of the page of the electronic document, wherein the margins are automatically determined as a region of the page remaining after creating the layout grid and where the margins correspond to cell boundaries of the created layout grid; and typesetting the plurality of characters using the defined arrangement of the layout grid.

2. The method of claim 1, further comprising:
    receiving data to be laid out on the created layout grid.

3. The method of claim 1, wherein the electronic document includes a plurality of pages and a distinct layout grid is created for each page of the electronic document.

4. The method of claim 1, wherein the second dialog box includes one or more user modifiable grid parameters that determine an interline spacing for lines of text laid out on the layout grid, where the interline spacing defines a spacing between rows of cells in the layout grid.

5. The method of claim 1, wherein the layout grid has a plurality of cells, each cell being sized to accommodate one full-width character, and wherein the cell dimensions are automatically generated to conform to the dimensions of an embox or ICF box for a particular font selected by a user in the second dialog box.

6. The method of claim 1, further comprising:
    displaying a user-selectable margin/column mode on the first dialog box;
    receiving user inputs defining margin values for the new electronic document if the user selects the margin/column mode; and
    creating a layout grid in the electronic document based on the margin values.

7. A computer program product, stored on a machine-readable medium, comprising instructions operable to cause a programmable processor to:
    receive a user input to create a new electronic document;
    display a first dialog box having a layout grid mode on a display; create the electronic document;
    display a second dialog box that includes user modifiable values for a plurality of grid parameters for a layout grid for the new electronic document if the user selects the layout grid mode, the grid parameters including a plurality of parameters for defining typesetting attributes of the layout grid according to a content to be typeset;
    generate one or more layout grids within the electronic document, where the instruction to generate the one or more layout grids within the electronic document include instructions to:
        create a layout grid for a page in the electronic document using the user-inputted values for the plurality of grid parameters, the grid parameters defining a grid starting point and dimensions, the layout grid defining a particular arrangement of grid cells and providing that provides a guide for positioning a plurality of characters for typesetting; and
        use the grid parameters of the layout grid to determine the margins of the page of the electronic document, wherein the margins are automatically determined as a region of the page remaining after creating the layout grid and where the margins correspond to cell boundaries of the created layout grid; and
    typeset the plurality of characters using the defined arrangement of the layout grid.

8. The product of claim 7, further comprising instructions operable to cause a programmable processor to:
    receive data to be laid out on the layout grid.

9. The product of claim 7, wherein the electronic document includes a plurality of pages and a distinct layout grid is created for each page of the electronic document.

10. The product of claim 7, wherein the second dialog box includes one or more user modifiable grid parameters that determine an interline spacing for lines of text laid out on the layout grid, where the interline spacing defines a spacing between rows of cells in the layout grid.

11. The product of claim 7, wherein the layout grid has a plurality of cells, each cell being sized to accommodate one full-width character, and wherein the cell dimensions are automatically generated to conform to the dimensions of an embox or ICF box for a particular font selected by a user in the second dialog box.

12. The product of claim 7, further comprising instructions operable to cause a programmable processor to:
display a user-selectable margin/column mode on the first dialog box;
receive user inputs defining margin values for the new electronic document if the user selects the margin/column mode; and
create a layout grid in the electronic document based on the margin values.

13. A system for controlling typesetting and layout editing, comprising:
a desktop publishing processing control device provided with typesetting and layout control means for processing data to be laid out;
a display for displaying data during typesetting or layout processing; and
input means for a user to supply control instructions to the typesetting and layout control means the typesetting and layout control means being provided with a layout grid creation means arranged to:
display a first dialog box having a layout grid mode on a display when creating a new electronic document;
create the electronic document;
display a second dialog box that includes user modifiable values for a plurality of grid parameters for a layout grid for the new electronic document if the user selects the layout grid mode, the grid parameters including a plurality of parameters for defining typesetting attributes of the layout grid according to a content to be typeset;
generate one or more layout grids within the electronic document, where generating the one or more layout grids within the electronic document includes:
creating a layout grid for a page in the electronic document using user-inputted values for the plurality of grid parameters, the grid parameters defining a grid starting point and dimensions, the layout grid defining a particular arrangement of grid cells and providing a guide for positioning a plurality of characters for typesetting; and
using the grid parameters of the layout grid to the margins of the page of the electronic document, wherein the margins are automatically determined as a region of the page remaining after creating the layout grid and where the margins correspond to cell boundaries of the created layout grid; and
typeset the plurality of characters using the defined arrangement of the layout grid.

14. A method for controlling typesetting and layout editing, comprising:
displaying a page of an electronic document on a display;
creating a layout grid in the electronic document, the layout grid defining a particular arrangement for positioning individual characters of a plurality of characters for typesetting, wherein the grid parameters define a grid starting point and dimensions;
creating a frame grid that includes an interior grid bounded by a frame, the interior grid having a plurality of cells for laying out the plurality of characters in the particular arrangement, wherein each cell positions a single character of the plurality of characters for typesetting the plurality of characters within the interior grid, and wherein the boundary formed by the frame conforms to the periphery of the outermost cells of the plurality of cells and does not intersect any cell of the interior grid; and
positioning the frame grid to overlap a plurality of cells of the layout grid of the electronic document, including positioning the frame grid according to one or more attraction points between the frame grid and the layout grid, and
wherein the interior grid is defined according to a plurality of user-inputted grid parameters including parameters for defining typesetting attributes of the interior grid according to a content to be typeset.

15. The method of claim 14, further comprising:
determining the frame grid dimensions by a user input selecting a grid tool displayed on the display with a pointing device and dragging a cursor a specified length on the page; and
automatically adjusting the dimensions of the frame grid from the user input dimensions such that the boundary formed by the frame conforms to the periphery of the outermost cells of the plurality of cells and does not intersect any cell of the interior grid.

16. The method of claim 15, further comprising:
changing the frame grid dimensions by a user input selecting a control point on the frame grid, dragging the control point a specified length, and releasing the selection state using the pointing device; and
automatically adjusting the dimensions of the frame grid from the user input dimensions such that the boundary formed by the frame conforms to the periphery of the outermost cells of the plurality of cells and does not intersect any cell of the interior grid.

17. The method of claim 14, wherein each cell of the plurality of cells has a shape that is substantially square, and where each cell conforms to an embox or ICF box corresponding to a particular character font and character dimensions.

18. The method of claim 14, further comprising:
presenting a plurality of named grids for selection, each named grid having specific grid parameter values; and
receiving a user selection of a named grid such that the frame grid is created using the grid parameters of the selected named grid.

19. The method of claim 18, further comprising:
displaying a named grid palette containing a list of names of the plurality of named grids on the display.

20. The method of claim 18, wherein a layout grid demarcating a layout reference on a page is created on each page of the electronic document, and presenting the plurality of named grids includes presenting a named grid named "layout grid", and wherein in response to a user selection of the "layout grid" named grid a frame grid is created having the grid parameters of the layout grid formed on the page.

21. A computer program product, stored on a machine-readable medium, comprising instructions operable to cause a programmable processor to:
display a page of an electronic document on a display;
create a layout grid in the electronic document, the layout grid defining a particular arrangement for positioning individual characters of a plurality of characters for typesetting, wherein the grid parameters define a grid starting point and dimensions;
create a frame grid that includes an interior grid bounded by a frame, the interior grid having a plurality of cells for laying out the plurality of characters in the particular arrangement, wherein each cell positions a single character of the plurality of characters for typesetting the plurality of characters within the interior grid, and wherein the boundary formed by the frame conforms to the periphery of the outermost cells of the plurality of cells and does not intersect any cell of the interior grid; and position the frame grid to overlap a plurality of cells of the layout grid of the electronic document, including positioning the frame grid according to one or more attraction points between the frame grid and the layout grid, and wherein the interior grid is defined according to a plurality of user-inputted grid parameters including parameters for defining typesetting attributes of the interior grid according to a content to be typeset.

22. The product of claim 21, further comprising instructions operable to cause a programmable processor to:

determine the frame grid dimensions by a user input selecting a grid tool displayed on the display with a pointing device and dragging a cursor a specified length on a page; and automatically adjust the dimensions of the frame grid from the user input dimensions such that the boundary formed by the frame conforms to the periphery of the outermost cells of the plurality of cells and does not intersect any cell of the interior grid.

23. The product of claim 22, further comprising instructions operable to cause a programmable processor to:

change the frame grid dimensions by a user selecting a control point on the frame grid, dragging the control point a specified length, and releasing the selection state using the pointing device; and automatically adjust the dimensions of the frame grid from the user input dimensions such that the boundary formed by the frame conforms to the periphery of the outermost cells of the plurality of cells and does not intersect any cell of the interior grid.

24. The product of claim 21, wherein each cell of the plurality of cells has a shape that is substantially square, and where each cell conforms to an embox or ICF box corresponding to a particular character font and character dimensions.

25. The product of claim 21, further comprising instructions to:

present a plurality of named grids for selection, each named grid having specific grid parameter values; and receive a user selection of a named grid such that the frame grid is created using the grid parameters of the selected named grid.

26. The product of claim 25, further comprising instructions to:

display a named grid palette containing a list of names of the plurality of named grids on the display.

27. The product of claim 25, wherein a layout grid demarcating a layout reference on a page is created on each page of the electronic document, and presenting the plurality of named grids instructions to present a named grid named "layout grid", and wherein in response to a user selection of the "layout grid" named grid a frame grid is created having the grid parameters of the layout grid formed on the page.

28. A control system for typesetting and layout editing, comprising:

a desktop publishing processing control device provided with typesetting and layout control means for processing data to be laid out;

a display for displaying a page of an electronic document; and input means for a user to supply control instructions to the typesetting and layout control means; wherein the typesetting and layout control means is provided with a frame grid processing means that provides for creating a frame grid that includes an interior grid bounded by a frame, the interior grid having a plurality of cells for laying out a plurality of characters in a particular arrangement, wherein each cell positions a single character of the plurality of characters for typesetting the plurality of characters within the interior grid, wherein:

the interior grid is defined according to a plurality of user-inputted grid parameters including parameters for defining typesetting attributes of the interior grid according to a content to be typeset, and the boundary formed by the frame conforms to the periphery of the outermost cells of the plurality of cells and does not intersect any cell of the interior grid, and positioning the frame grid to overlap a plurality of cells of a layout grid in the electronic document, including positioning the frame grid according to one or more attraction between the frame grid and the layout grid.

* * * * *

UNITED STATES PATENT AND TRADEMARK OFFICE
CERTIFICATE OF CORRECTION

| | | |
|---|---|---|
| PATENT NO. | : 7,320,104 B2 | Page 1 of 1 |
| APPLICATION NO. | : 10/203668 | |
| DATED | : January 15, 2008 | |
| INVENTOR(S) | : Nathaniel M. McCully, Marilyn E. Shade and Heath A. Lynn | |

It is certified that error appears in the above-identified patent and that said Letters Patent is hereby corrected as shown below:

On the Cover Page:
    left column, please insert:
        --(60) Related U.S. Application Data
        Provisional Application No. 60/182,128, filed on February 12, 2000.--

Claim 27:
    column 20, line 11:
        insert --includes--, before "instructions"

Signed and Sealed this
Ninth Day of October, 2012

David J. Kappos
*Director of the United States Patent and Trademark Office*